United States Patent
Xue et al.

(10) Patent No.: US 11,894,563 B2
(45) Date of Patent: Feb. 6, 2024

(54) DIRECT METHANE FUELED THIN FILM SOFC TECHNOLOGY

(71) Applicant: University of South Carolina, Columbia, SC (US)

(72) Inventors: Xingjian Xue, Chapin, SC (US); Chunlei Ren, West Columbia, SC (US)

(73) Assignee: University of South Carolina, Columbia, SC (US)

(*) Notice: Subject to any disclaimer, the term of this patent is extended or adjusted under 35 U.S.C. 154(b) by 112 days.

(21) Appl. No.: 17/512,918

(22) Filed: Oct. 28, 2021

(65) Prior Publication Data

US 2022/0209247 A1 Jun. 30, 2022

Related U.S. Application Data

(60) Provisional application No. 63/130,963, filed on Dec. 28, 2020.

(51) Int. Cl.
| | |
|---|---|
| *H01M 4/86* | (2006.01) |
| *H01M 8/12* | (2016.01) |
| *H01M 4/88* | (2006.01) |

(52) U.S. Cl.
CPC ....... *H01M 4/8626* (2013.01); *H01M 4/8807* (2013.01); *H01M 8/12* (2013.01); *H01M 2004/8684* (2013.01); *H01M 2008/1293* (2013.01)

(58) Field of Classification Search
CPC .. H01M 4/8626; H01M 4/861; H01M 4/8605; H01M 4/8807; H01M 4/8803; H01M 8/12; H01M 2004/8684; H01M 2008/1293
See application file for complete search history.

(56) References Cited

U.S. PATENT DOCUMENTS

| | | | |
|---|---|---|---|
| 2008/0286625 A1* | 11/2008 | Sarkar | H01M 8/1213 429/479 |
| 2016/0268620 A1* | 9/2016 | Lin | H01M 8/124 |
| 2020/0227766 A1* | 7/2020 | Milcarek | H01M 8/1213 |

* cited by examiner

*Primary Examiner* — Raymond Alejandro
(74) *Attorney, Agent, or Firm* — Burr & Forman LLP; Douglas L. Lineberry

(57) ABSTRACT

Described herein are novel alumina substrate-supported thin film SOFCs that may be produced at significantly reduced cost while providing improved robustness, high electrochemical performance, and the capability of effective carbon deposition resistance while still using Ni-cermet as an anode functional layer.

8 Claims, 34 Drawing Sheets

Table 1. Concise Comparison of Cell Structures and Corresponding Fabrication Procedures

| | support | anode | electrolyte | cathode |
|---|---|---|---|---|
| | materials/firing temperature (°C)/final thickness (μm) | | | |
| cell-1 | Ni-SDC/1100/150 | | SDC/1450/12 | PBCO/1100/15 |
| cell-2 | NiAl$_2$O$_4$/1300/150 | Ni-SDC/1000/20 | SDC/1450/10 | PBCO/1100/13 |
| cell-3 | Al$_2$O$_3$/1500/160 | Ni-SDC/1000/20 | SDC/1450/10 | PBCO/1100/15 |

FIGURE 11

Table 2. Comparisons of Open Circuit Voltage (OCV, V), Peak Power Density (P, W cm$^{-2}$), Ohmic Resistance (Ro, Ω cm$^2$), and Overall Polarization Resistance (Rp, Ω cm$^2$) of Three Types of NiO-SDC/SDC/PBCO Cells in Direct Dry Methane

| | OCV (V) | | | P (W cm$^{-2}$) | | | R$_o$/R$_p$ (Ω cm$^2$) | | |
|---|---|---|---|---|---|---|---|---|---|
| | 600 °C | 650 °C | 700 °C | 600 °C | 650 °C | 700 °C | 600 °C | 650 °C | 700 °C |
| NiO-SDC anode-supported cell | 0.87 | 0.84 | 0.83 | 0.57 | 0.80 | 1.08 | 0.31/0.28 | 0.28/0.16 | 0.25/0.07 |
| NiAl$_2$O$_4$-supported thin film cell | 0.88 | 0.86 | 0.85 | 0.43 | 0.72 | 0.87 | 0.36/0.31 | 0.34/0.18 | 0.28/0.08 |
| Alumina-supported thin film cell | 0.87 | 0.85 | 0.84 | 0.36 | 0.63 | 0.79 | 0.39/0.36 | 0.36/0.21 | 0.30/0.11 |

FIGURE 12

TABLE 3

Compositions of the spinning slurries for dual-layer micro-tubes.

| Layer | Composition (wt%) | | | | |
|---|---|---|---|---|---|
| | NMP | PESf | PVP | NiO/SDC | Graphite |
| Inner | 42.0 | 7.0 | 1.0 | — | 50.0 |
| Outer | 16.8 | 2.8 | 0.4 | 80.0 | — |
| | 21.0 | 3.5 | 0.5 | 75.0 | — |
| | 25.2 | 4.2 | 0.6 | 70.0 | — |

FIGURE 16

TABLE 4

Extrusion parameters for dual-layer anode substrate.

| Parameters | Values |
|---|---|
| Air gap (mm) | 5.0 |
| Room temperature (°C) | 20.0 |
| $N_2$ pressure used for inner coagulant (bar) | 0.5 |
| Estimated inner coagulant flow rate (mL/min) | 5.0 |
| $N_2$ pressure used for graphite slurry (bar) | 3.0 |
| Estimated graphite slurry flow rate (mL/min) | 7.0 |
| $N_2$ pressure used for NiO/SDC slurry (bar) | 3.0 |
| Estimated anode slurry flow rate (mL/min) | 5.2 (80%), 6.9 (75%), 8.8 (70%) |

FIGURE 19

TABLE 5

Composition of SDC electrolyte solution.

| Component | Weight percentage |
|---|---|
| SDC | 10.0% |
| Ethanol (Solvent) | 87.5% |
| Triethanolamine (Dispersant) | 1.0% |
| Di-n-butyl phthalate (Plasticizer) | 0.5% |
| Polyethylene glycol, M.W. 300 (Plasticizer) | 0.5% |
| Polyvinyl Butyral (Binder) | 0.5% |

FIGURE 21

TABLE 6

Comparisons of open circuit voltage (V), peak power density (P, mW cm$^{-2}$), ohmic resistance (Ro, Ω cm$^2$), and overall polarization resistance (Rp, Ω cm$^2$) at 600°C for anode-supported cells NiO-SDC/SDC/PBCO.

| Rp | Ro | P | OCV | Cathode | Electrolyte | Anode | Configuration | Ref. |
|---|---|---|---|---|---|---|---|---|
| | | | | | Cell components | | | |
| 0.08 | 0.16 | 620 | 0.83 | PBCO | 20 μm SDC | Ni-SDC | Planar | [4] |
| 0.08 | 0.17 | 875 | 0.84 | SDC-PBCO | 25 μm SDC | Ni-SDC | Planar | [50] |
| 0.06 | 0.19 | 600 | 0.83 | PBCO | 26 μm SDC | Ni-SDC | Planar | [51] |
| 0.05 | 0.12 | 1484 | 0.85 | PBCO | 10 μm SDC | Ni-SDC | Micro-tubular | This work with dual-layer co-extrusion |
| 0.06 | 0.15 | 954 | 0.85 | PBCO | 10 μm SDC | Ni-SDC | Micro-tubular | This work with single-layer extrusion |

FIGURE 29

DIRECT METHANE FUELED THIN FILM SOFC TECHNOLOGY

STATEMENT REGARDING FEDERALLY SPONSORED RESEARCH

This invention was made with government support under DE-FE0031473 and DE-FE0024059 awarded by the Department of Energy. The government may have certain rights in the invention.

TECHNICAL FIELD

The subject matter disclosed herein is generally directed to novel alumina substrate-supported thin film SOFCs that may be produced at significantly reduced cost while providing improved robustness, high electrochemical performance, and the capability of effective carbon deposition resistance while still using Ni-cermet as an anode functional layer.

BACKGROUND

Solid oxide fuel cell (SOFC) is an electrochemical energy conversion device that converts chemical energy in fuels directly into electricity in a highly efficient and environmentally friendly manner. Fuels used for SOFCs are very flexible including hydrogen, ammonia, various hydrocarbons, even carbon. Given the fact that various hydrocarbon fuels can be directly obtained or derived from abundant resources, for example, natural gas, fossil fuel, biomass, etc., direct utilization of hydrocarbon fuels for highly efficient electricity generation is a prominent advantage of SOFC technology and has attracted wide attentions. Anode electrode plays an important role in hydrocarbon fueled SOFCs. Using a typical Ni-cermet (the composite of Ni and electrolyte material) anode as an example, very complicated catalytic and electrocatalytic reactions take place. Electrocatalytic reactions could include electrochemical oxidations of fuel species at triple phase boundary (TPB) sites, for example, $H_2$, CO, and various hydrocarbon species. Catalytic reactions are mainly Ni-catalyst enabled ones, such as steam reforming reaction, dry reforming reaction, decomposition of hydrocarbons, Boudouard reaction, and CO hydrogenation reaction.

The latter three catalytic reactions will directly generate carbon. The deposition of generated carbon would deactivate active reaction sites, block fuel/gas flow toward reaction sites, and damage microstructures, leading to performance degradations and failure of SOFCs. The issue associated with carbon deposition in Ni-cermet anode electrode has been a major barrier toward practical applications of hydrocarbon fueled SOFCs.

Significant efforts have been made to enhance carbon deposition resistance of Ni-cermet anodes. One class of strategy is to alloy Ni with other metals. The high cost of noble metals basically rules out wide applications of Ni-noble metal alloys. While Ni alloying with top row transition metals may improve their carbon deposition resistance, the corresponding catalytic activities are usually sacrificed. Efforts have been attempted to increase anode basicity using alkaline earth metals so that the electronic state of nearby Ni is modified, making it less active for carbon deposition. Likewise, the reaction atmosphere nearby Ni is changed using materials with capability of water adsorption/storage or oxygen storage such that carbon on Ni particles can be oxidized. Despite these modifications, it seems that the carbon deposition issue is inevitable for Ni-based anodes, especially anode-supported SOFCs. Attempts have been made to replace Ni-cermet with Ni-free anode materials. These typically include nonmetal electronic conductors and a family of perovskite- and layered perovskite-type of mixed ionic and electronic conducting (MIEC) oxides. Although such materials are able to mitigate carbon depositions, their catalytic property and electronic conductivity are much lower than those of Ni-cermet counterparts. Accordingly, power density outputs of the corresponding SOFCs are lower than those of Ni-cermets, especially for anode-supported designs. In literature, surface catalytic properties of MIECs are enhanced by bonding or arching metal nanoparticles through infiltrations or surface exsolution, respectively. Because of their low bulk electronic conductivities, it is more suitable for such materials to be used as anode electrode in electrolyte-supported SOFCs, where thick electrolyte is used to support the entire cell, while thin anode may mitigate the deficiency of anode electrical conductivity for current collection. The thick electrolyte in turn will cause high ohmic resistances and low power densities. In retrospect of these strategies, it seems that Ni-cermet is still a preferred anode material particularly for anode-supported designs due to its high electronic conductivity and excellent (electro)catalytic properties. Therefore, it would be desired to use Ni-cermet anode while being able to prevent carbon deposition in direct hydrocarbon fuels.

In principle, a stoichiometric amount of gas compositions is needed to avoid carbon generation in anode electrode. In particular, the oxygen to carbon (O/C) ratio should be maintained at a sufficiently high level so that reactions toward carbon generation are inhibited or carbon generated in the anode can be oxidized. A passive method for this is to attach a thick buffer layer on anode electrode so that higher local steam to carbon ratios can be obtained in the anode. Nevertheless, thick buffer layer increases resistance for fuel/gas diffusion and therefore concentration polarization resistance. A more active way is to supply oxygen (or oxygen containing gases) into the anode electrode directly, including externally supplied gases, for example, $O_2$, $H_2O$, or $CO_2$, and oxygen ions from cathode side through electrolyte. Unfortunately, externally supplied oxygen has disadvantages of diluting fuels and potentially oxidizing Ni phase. Furthermore, oxygen supply units, for example, steam generator, are needed, which would increase the cost and complexity of SOFC systems. In this respect, direct hydrocarbon fueled SOFCs are highly desired, and oxygen ions from cathode side might be the only oxygen source that can be used to inhibit carbon deposition (e.g., oxidize surface carbons) without sacrificing SOFC performance.

Fuel flexibility is an attractive advantage of solid oxide fuel cell (SOFC) technology; however, carbon deposition issues with widely used Ni-cermet anodes in hydrocarbon fuels seriously limits its long-term stability. While alternative anode materials have been developed to overcome this issue, none of these materials demonstrates electronic conductivity and (electro) catalytic activity that can compete with those of Ni-cermets.

Accordingly, it is an object of the present disclosure to provide a Ni-cermet anode while effectively preventing carbon deposition. Therefore, it is desired to use the Ni-cermet anode while being able to effectively prevent carbon deposition. For this purpose, a microtubular alumina substrate-supported thin film SOFC Ni—$Ce_{0.8}Sm_{0.2}O_{1.9}$/$Ce_{0.8}Sm_{0.2}O_{1.9}$/$PrBaC_{0.2}O_{5+\delta}$ (Ni-SDC/SDC/PBCO) is studied and compared with conventional Ni-SDC anode and $NiAl_2O_4$ substrate-supported cells. Alumina- and $NiAl_2O_4$-supported cells obtain peak power densities of 1.15/0.79 W cm$^{-2}$ and 1.23/0.82 W cm$^{-2}$ at 700° C. in wet hydrogen/dry methane, comparable to those of Ni-SDC-supported cell, that is, 1.5/1.08 W cm$^{-2}$, respectively. Both alumina- and NiAl$_2$O$_4$-supported cells demonstrate very good short-term stability with the former showing better stability in dry methane under both high current loading and open circuit voltage conditions, whereas the Ni-SDC-supported cell quickly dies out. Carbon deposition and prevention mechanisms of three different cell designs are discussed by combining post-test cell characterizations with various chemical/ electrochemical reactions.

Citation or identification of any document in this application is not an admission that such a document is available as prior art to the present disclosure.

SUMMARY

The above objectives are accomplished according to the present disclosure by providing A micro-tubular solid oxide fuel cell. The fuel cell may include a NiO-SDC anode substrate, an internal graphite layer, at least one micro channel forming a micro channel array extending through both the NiO-SDC anode and the internal graphite layer, and the internal graphite layer is removed to provide access to the at least one micro channel in the NiO-SDC anode substrate, an electrolyte outer coating; and at least one cathode ink applied to the electrolyte outer coating. Further, the micro channel array may be radially aligned with respect to the NiO-SDC anode substrate. Still yet, peak power density may be at least 1.5 times that of a cell with an anode substrate fabricated from a single layer extrusion method. Again, multi-layered microstructures may be formed within the fuel cell. Still yet, the micro channel array reduces a polarization resistance of the fuel cell. Further still, the fuel cell may have an increased fuel utilization rate as compared to a conventional fuel cell. Still yet, the fuel cell may exhibit gas permeation performance approximately nine times greater than a conventional fuel cell formed from a single layer extrusion method. Even further, the fuel cell may exhibit open circuit voltages exceeding those of a conventional fuel cell formed from a single layer extrusion method.

In a further embodiment, the disclosure provides a method for making a micro-channel array structured microtubular solid oxide fuel cell. The method may include employing at least one polymer binder, at least one solvent and at least one dispersant to prepare an organic solution, mixing at least two anode powders and introducing them to the organic solution to form an anode slurry, employing a graphite slurry as an inner layer of an anode substrate with the anode slurry forming an outer layer, employing an internal coagulant, employing a phase inversion based dual-layer co-extrusion process with respect to the graphite slurry, anode slurry and internal coagulant, solidifying the respective slurries to form at least one micro-tubular body, applying at least one electrolyte layer to the at least one micro-tubular body, and applying at least one cathode ink onto the at least one electrolyte layer. Further, the at least two anode powders may comprise NiO and SDC. Still yet, the method may include producing finger-like pores via phase inversion. Further yet, the internal graphite layer may be removed from the fuel cell via firing. Even further, a radially aligned micro channel array may be formed within the NiO-SDC anode substrate. Still further, the fuel cell may be formed such that peak power density is at least 1.5 times that of a conventional fuel cell with an anode substrate fabricated from a single layer extrusion method. Moreover, the method may include forming multi-layered microstructures within the fuel cell. Still further, a micro channel array may be formed to reduce a polarization resistance of the fuel cell. Even still, the fuel can be formed to have an increased fuel utilization rate as compared to a conventional fuel cell. Again further, the fuel cell can be formed to exhibit gas permeation performance approximately nine times greater than a conventional fuel cell formed from a single layer extrusion method. Yet still again, the fuel cell may be formed to exhibit open circuit voltages exceeding those of a conventional fuel cell formed from a single layer extrusion method.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 11 shows Table 1, Concise Comparison of Cell Structures and Corresponding Fabrication Procedures.

FIG. 12 shows Table 2, Comparisons of Open Circuit Voltage (OCV, V), Peak Power Density (P, W cm−2), Ohmic Resistance ($R_o$, Ωcm$^2$), and Overall Polarization Resistance ($R_p$, Ωcm$^2$) of Three Types of NiO-SDC/SDC/PBCO Cells in Direct Dry Methane.

FIG. 15 shows a typical microstructure of micro-tubular substrate prepared through conventional phase inversion based extrusion method at: (a) SEM image of NiO-SDC anode substrate; and (b) schematic illustration of microstructure features.

FIG. 16 shows Table 3.

FIG. 19 shows Table 4.

FIG. 21 shows Table 5.

FIG. 29 shows Table 6.

Figure 1:
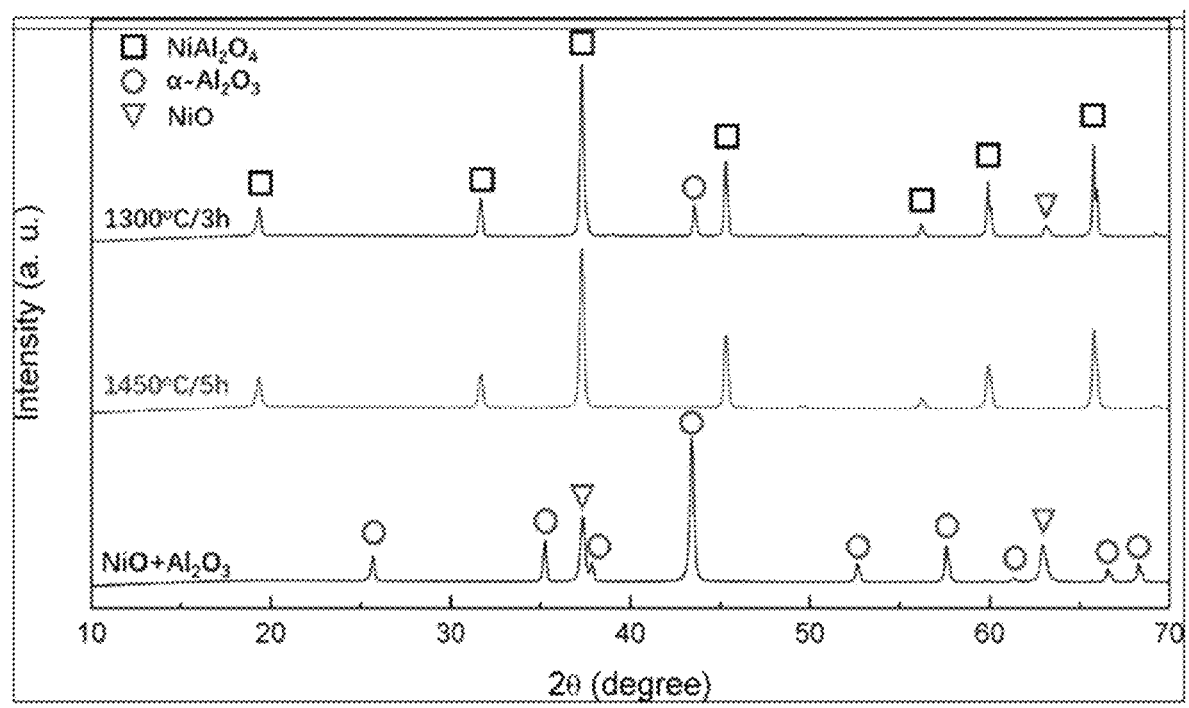
FIG. 1 shows XRD patterns of substrates with stoichiometric amount of NiO and Al$_2$O$_3$ fired at different temperatures in air.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used herein, the terms "weight percent," "wt %," and "wt. %," which can be used interchangeably, indicate the percent by weight of a given component based on the total weight of a composition of which it is a component, unless otherwise specified. That is, unless otherwise specified, all wt % values are based on the total weight of the composition. It should be understood that the sum of wt % values for all components in a disclosed composition or formulation are equal to 100. Alternatively, if the wt % value is based on the total weight of a subset of components in a composition, it should be understood that the sum of wt % values the specified components in the disclosed composition or formulation are equal to 100.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

It is noteworthy that although TPB sites are uniformly distributed in a thick Ni-cermet an-ode electrode in anode-supported SOFCs, studies have shown that electrochemical reactions are mainly confined within a narrow range near anode/electrolyte interface or effective reaction zone. In other words, oxygen ions from cathode side would be largely consumed by electrochemical oxidation of fuel species in this effective reaction zone. As long as oxygen ions are continuously supplied, carbon deposition could be completely inhibited in this region. Beyond this range, little oxygen ions would be available for electro-catalytic reactions. Accordingly, only catalytic reactions of fuel/gas species enabled by Ni-phase could occur beyond effective reaction zone. Therefore, if catalytically inert material is used beyond effective reaction zone, it would prohibit catalytic reactions, potentially preventing carbon generation and deposition in the anode electrode.

In this research, a novel alumina substrate-supported thin film SOFC is studied to handle carbon deposition issue in direct dry methane fuel. Alumina is selected as an anode substrate because of its inert catalytic property, low price, excellent chemical and mechanical stability both in redox atmosphere, and at high temperatures. Alumina substrate is featured with well-aligned microchannels and open at inner surface, enabling facile fuel/gas diffusion. See, Ren, C. L.; Gan, Y.; Yang, C. Y.; Lee, M. J.; Dong, G. H.; Xue, X. J. Fabrication and Characterization of High Performance Intermediate Temperature Alumina Substrate Supported Micro-Tubular SOFCs. J. Electrochem. Soc. 2017, 164, F722-F731. This strategy is different from anode buffer layer design in that the latter intentionally resists fuel/gas diffusion.

It is well-known that planar and tubular designs are two classic SOFC configuration designs. Compared to planar design, tubular design has many desired characteristics such as simple sealing requirement and good thermal-structural robustness. However, tubular design also imposes great difficulties on SOFC fabrication process design especially microtubular SOFCs, where the diameter of the cell is relatively small. The fabrication process is further complicated by thermal expansion mismatch between alumina substrate and thin film SOFC. In the first part of this disclosure, the fabrication of a novel microtubular alumina substrate-supported thin film cell SOFC Ni—$Ce_{0.9}Sm_{0.2}O_{1.9}$/$Ce_{0.8}Sm_{0.2}O_{1.9}$/$PrBaCo_2O_{5+\delta}$ (Ni-SDC/SDC/PBCO) is presented, followed by comprehensive characterization, electrochemical performance, and stability testing in direct dry methane fuel. For comparison, anode-supported microtubular cell Ni-SDC/SDC/PBCO and $NiAl_2O_4$ spinel substrate-supported thin film cell Ni-SDC/SDC/PBCO are also fabricated, characterized and electrochemically tested. Carbon deposition and resistance mechanisms of the three cells are compared and discussed by combining post-test cell characterizations with chemical/electrochemical reactions. Advantages of the novel microtubular alumina substrate-supported thin film cell are highlighted.

Fabrication and Characterization of Microtubular Cells

Fabrications of novel alumina-supported cells are primarily composed of two parts: microtubular alumina substrate and thin film cell Ni-SDC/SDC/PBCO. For microtubular alumina substrate fabrication, the first step is to prepare alumina slurry. Briefly, poly(ether sulfone) (PESf, 5.6 wt %) (Veradel 3000P, Solvay Specialty Polymers, USA) and polyvinylpyrrolidone (PVP, 0.8 wt %) (K30, CP, Sinopharm Chemical Reagent Co., China) were dissolved in N-methyl-2-pyrrolidone (NMP, 33.6 wt %) (HPLC grade, Sigma-Aldrich, USA) and ball-milled for 2 h. Commercial α-$Al_2O_3$ powders (60.0 wt %) (ultrapure grade, average particle size 0.75 μm, Inframat Advanced Materials, USA) were added into above organic mixture and subsequently ball-milled for 48 h to form a homogeneous spinning slurry. The as-prepared slurry was degassed for 10 min and then loaded into a spinneret extrusion system to extrude alumina microtubular substrate precursor. The details of extrusion system design and setup can be found elsewhere. Ren, C. L.; Gan, Y.; Lee, M.; Yang, C. Y.; He, F.; Jiang, Y. M.; Dong, G. H.; Green, R. D.; Xue, X. J. Fabrication and Characterization of High Performance Intermediate Temperature Micro-Tubular Solid Oxide Fuel Cells. J. Electrochem. Soc. 2016, 163, F1115-F1123. Once the extruded alumina substrate was immersed into water bath, phase-inversion process took place. The exchange between water (nonsolvent) in the bath and NMP (solvent) in the substrate slurry led to formation of radially well-aligned finger-like pores (microchannels). In the meantime, solidification process occurred due to the decrease of solvent (NMP) concentration in the substrate. The extruded microtubular green bodies were left in water bath for 24 h, allowing for completion of exchange and solidification process. After drying, green substrate was cut into different lengths, which were fired at 800° C. in air for 2 h to remove organic components, followed by sintering at 1500° C. in air for another 10 h to achieve sufficient mechanical strength for subsequent coatings of functional layers.

For fabrications of various functional layers, solutions for dip-coatings were first prepared. Briefly, for preparation of NiO-SDC solution, 30 wt % SDC (Tape cast grade, FCM, USA) and 70 wt % NiO (Fine grade, FCM, USA) powder with triethanolamine (dispersant), di-n-butyl phthalate (plasticizers), polyvinyl butyral (binder), and ethanol (solvent) were mixed together and ball-milled for 7 days before use. SDC solution for electrolyte layer coating was prepared using the same procedure. Sintered alumina substrate was sealed at both ends using PTFE films and vertically immersed into NiO-SDC solution for 5 min, then dried up in air at room temperature. Such a coating procedure was repeated for 10 times. After drying, the samples were fired at 1000° C. in air for 2 h. The assembly of substrate/NiO-SDC functional layer was subsequently coated with SDC electrolyte solution for 10 times with each time of 5 min, then dried at room temperature and subsequently sintered at 1450° C. in air for 5 h to densify SDC electrolyte and obtain half cells. All the heating and cooling rates were fixed at 3° C. min$^{-1}$. PrBaCo$_2$O$_{5+\delta}$ (PBCO) powders were synthesized using the Pechini process. Synthesized fine PBCO powders (40.0 wt %) were grinded with ethyl-cellulose and α-terpineol (6.0 wt %: 54.0 wt %, Alfa Aesar, USA) to form an electrode ink and then brush-painted onto the SDC electrolyte, followed by firing at 1100° C. in air for 3 h to form a single alumina substrate-supported thin film cell Ni-SDC/SDC/PBCO. Anode-supported microtubular cell Ni-SDC/SDC/PBCO and NiAl$_2$O$_4$ spinel substrate-supported thin film cell Ni-SDC/SDC/PBCO were fabricated using a process similar to that above. The major differences are slurry compositions for substrate extrusion and presintering temperatures for substrate fabrication. For preparation of NiO-SDC anode substrate slurry, NiO and SDC powders (NiO:SDC=70:30 wt %) were added into organic mixture of PESf, PVP, and NMP, and ball-milled, while NiAl$_2$O$_4$ spinel substrate slurry was obtained by mixing NiO and Al$_2$O$_3$ (NiO:Al$_2$O$_3$=1:1, molar ratio) with organic mixture of PESf, PVP, and NMP through ball-milling process. NiO-SDC substrate was presintered at 1100° C. in air for 5 h, while NiO—Al$_2$O$_3$ substrate was presintered at 1300° C. in air for 5 h and NiAl$_2$O$_4$ spinel phase in the substrate was formed in situ during high temperature sintering process.

After fired at different temperatures, NiO—Al$_2$O$_3$ substrates were ground into powders. Material phases formed in the substrates during high temperature sintering process were characterized using X-ray powder diffraction (XRD) with Cu-Kα radiation (D/MAX-3C). The obtained XRD patterns were indexed and compared with an ICCD database (International Centre for Diffraction Data). Microstructures of the prepared microtubular substrates and single cells as well as post-test cells were characterized using scanning electron microscopy (SEM, Zeiss Ultra Plus FESEM, Germany) at a voltage of 15 kV.

Energy-dispersive X-ray spectroscopy (EDS) was carried out for compositional analysis using an Oxford Instruments detector. Electrochemical performance of fabricated single cells was tested from 600 to 700° C. Silver wire was wound around the cathode and either end of the anode substrate and attached with silver paste to serve as current collectors. Ceramic paste (Aremco products, Inc. USA) was used to seal and attach either end of anode substrate onto a test stand. Temperature of the cell was controlled using a tube furnace (MTI, USA).

Nitrogen gas was first supplied to the anode at room temperature. The cell was then heated up from room temperature to 600° C. at the rate of 2° C. per minute. Once temperature of the cell reached 600° C., gas supplied to the anode was switched from nitrogen to wet hydrogen with the flow rate of 30 mL min−1. The anode under this humidified hydrogen condition was last for 5 h, allowing for completion of NiO reduction in anode/anode functional layer before electrochemical testing. The cathode was exposed to ambient air. Voltage-current (V-I) and electrochemical impedance spectra (EIS) were measured using a Solartron 1260/1287 electrochemical workstation. EIS measurements were performed with a voltage perturbation of 10 mV over the frequency range from 0.01 Hz to 105 Hz under open circuit voltage conditions. V-I curves were first obtained with humidified hydrogen as fuel (30 mL min−1). Nitrogen was then used to purge anode for 10 min. Direct dry methane with the flow rate of 30 mL min−1 was then supplied to the anode, and corresponding V-I curves and EIS were obtained. Short term (~60 h) stability tests were also carried out at 700° C. in several different operating conditions, including in the fuels of humidified hydrogen and direct dry methane, under open circuit voltage and a constant current density load of 1.0 A cm$^{-2}$, respectively. Cell voltage was monitored, and EIS was measured periodically online during the process of the stability test.

Results

Figure 2:
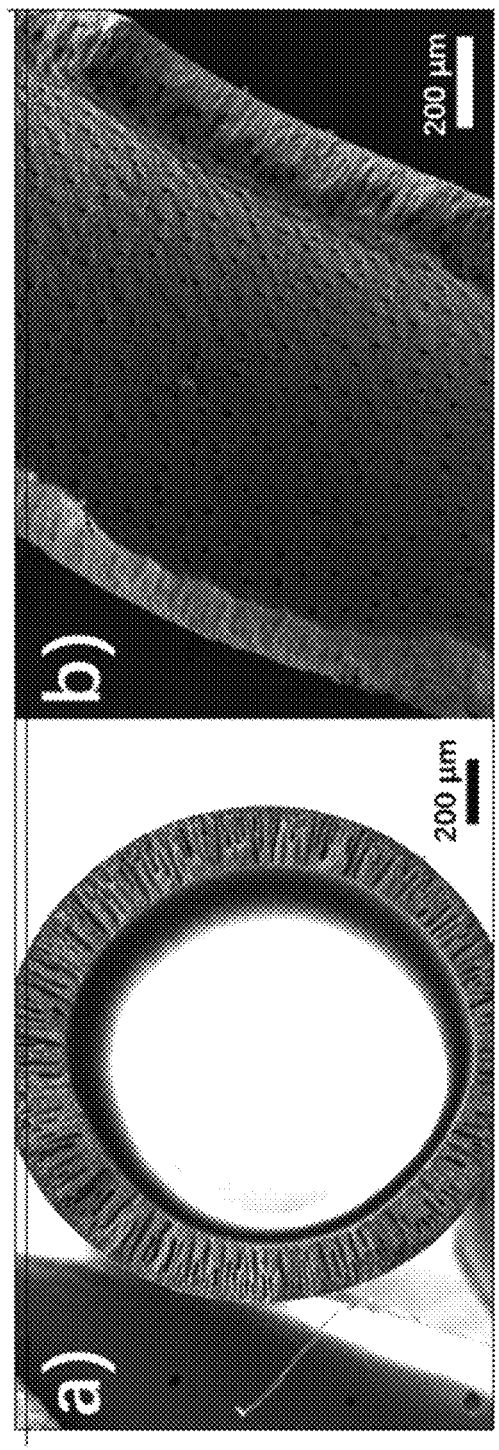
FIGURE. 2 SEM images of pure alumina substrate sintered at 1500° C. in air for 10 h. (a) Cross-section, (b) inner surface.

NiAl$_2$O$_4$ spinel phase in NiO—Al$_2$O$_3$ substrate is formed in situ during the high temperature sintering process. To determine phase compositions of the substrate, extruded green substrates with stoichiometric amount of NiO and Al$_2$O$_3$ were sintered at 1300° C. for 3 h (presintering condition) and 1450° C. for 5 h (electrolyte-sintering condition) in air, respectively. The sintered substrates were then crushed into powders for XRD measurement. As shown in FIG. 1, after heat treatment at 1300° C. in air for 3 h, the peaks corresponding to NiO and α-Al$_2$O$_3$ phases were significantly reduced, while very strong new peaks corresponding to NiAl$_2$O$_4$ spinel phase structure appeared. This result implies that NiO is chemically reacted with α-Al$_2$O$_3$, forming a secondary phase NiAl$_2$O$_4$. After sintering at 1450° C. in air for 5 h, XRD peaks corresponding to NiO and α-Al$_2$O$_3$ phases completely disappeared, implying that either complete chemical reactions occurred between NiO and α-Al$_2$O$_3$ phases or at least no detectable NiO or α-Al$_2$O$_3$ phase remained in the substrate. To examine microstructures of fabricated microtubular alumina substrate, corresponding SEM images were obtained after the substrate was sintered at 1500° C. in air for 10 h. As shown in FIG. 2, radially well aligned microchannels are embedded in the substrate with the diameters of 20-30 μm, see FIG. 2 at a. The microchannels are open at the inner surface of the substrate, see FIG. 2 at b. Microtubular substrate with such a microstructure may facilitate facile fuel/gas diffusion, enabling significant reduction of anode concentration polarization resistance. NiO-SDC and NiAl$_2$O$_4$ spinel substrates demonstrated similar microstructures after they were heat treated at different temperatures (not shown).

Figure 3:
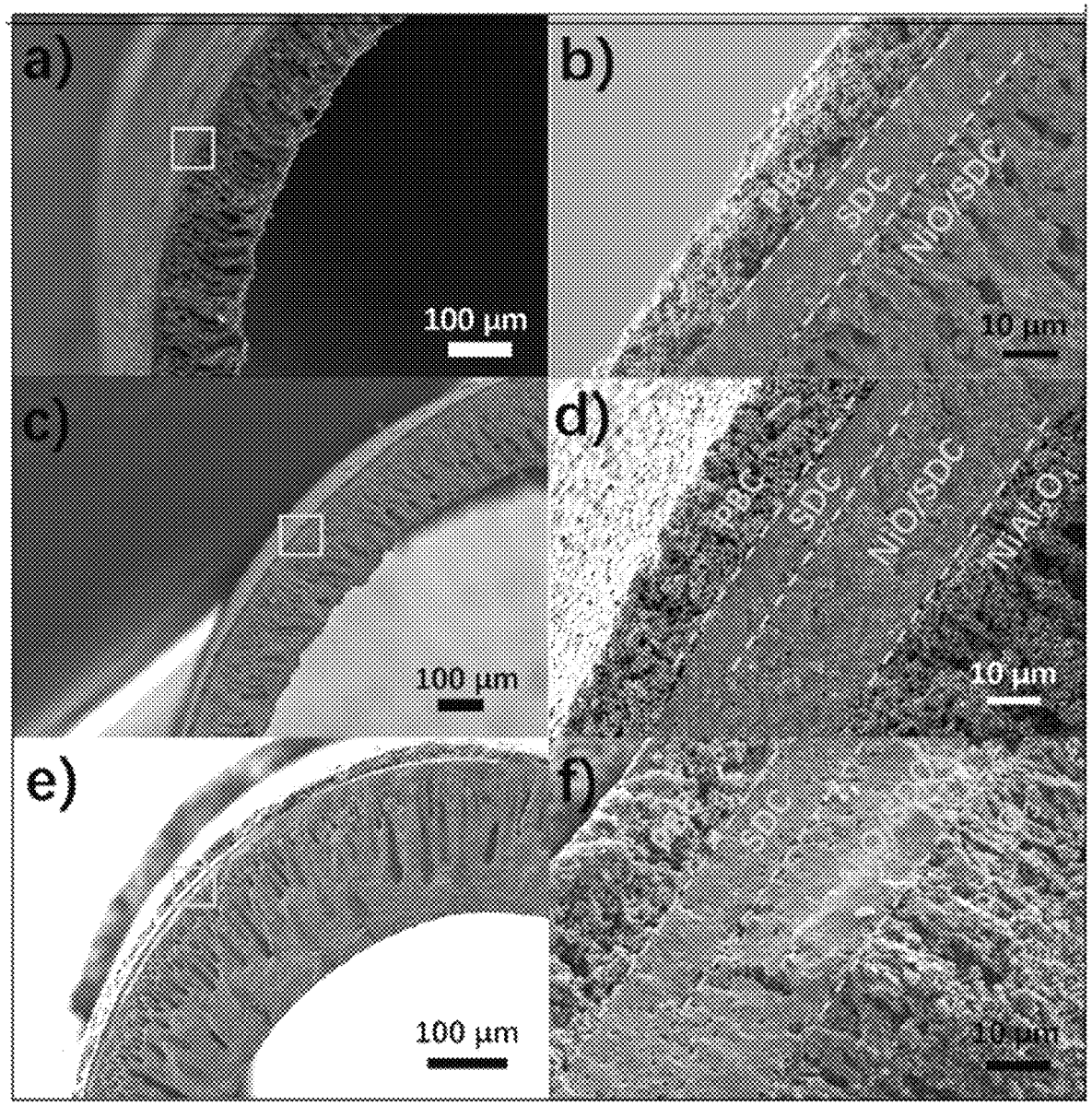
FIG. 3 shows at (a, b) Cross-sectional SEM images of anode-supported cell NiO-SDC/SDC/PBCO; thin film cell NiO-SDC/SDC/PBCO supported by (c, d) NiAl$_2$O$_4$ substrate and (e, f) pure Al$_2$O$_3$ substrate. (b, d, f) Enlarged microstructures in the areas marked by yellow squares in a, c, and e, respectively.

Built upon NiAl$_2$O$_4$ spinel and pure Al$_2$O$_3$ substrates, trilayer thin film cell Ni-SDC/SDC/PBCO was further fabricated. For Ni-SDC substrate (cell-1), only thin film SDC/PBCO was fabricated. As shown in FIG. 3 at a, the thickness of the NiO-SDC substrate is about 150 μm, and thicknesses of ~12 μm and ~15 μm were obtained for SDC electrolyte and PBCO cathode layer, respectively, see FIG. 3 at b. In the NiAl$_2$O$_4$-supported cell (cell-2), the thickness of substrate is ~150 μm, see FIG. 3 at c, while NiO-SDC anode functional layer, SDC electrolyte layer, and PBCO cathode layer are ~20 μm, ~10 μm, and ~13 μm, respectively, see FIG. 3 at d. Similarly, pure alumina-supported cell (cell-3) demonstrates the thickness of ~160 μm for alumina substrate, ~20 μm for NiO-SDC functional layer, ~10 μm for SDC dense electrolyte layer, and ~15 μm for PBCO cathode layer, respectively, see FIG. 3 at e and f.

SDC electrolyte in any of the three cells is dense, and neighboring layers show intimate contact with one another, no delamination is observed at various interfaces. It can also be seen that microchannels in the three substrates are well remained after several steps of high temperature sintering, implying their excellent thermal stability. A concise comparison of cell structures and corresponding fabrication procedures is provided in Table 1, see FIG. 11.

Figure 4:
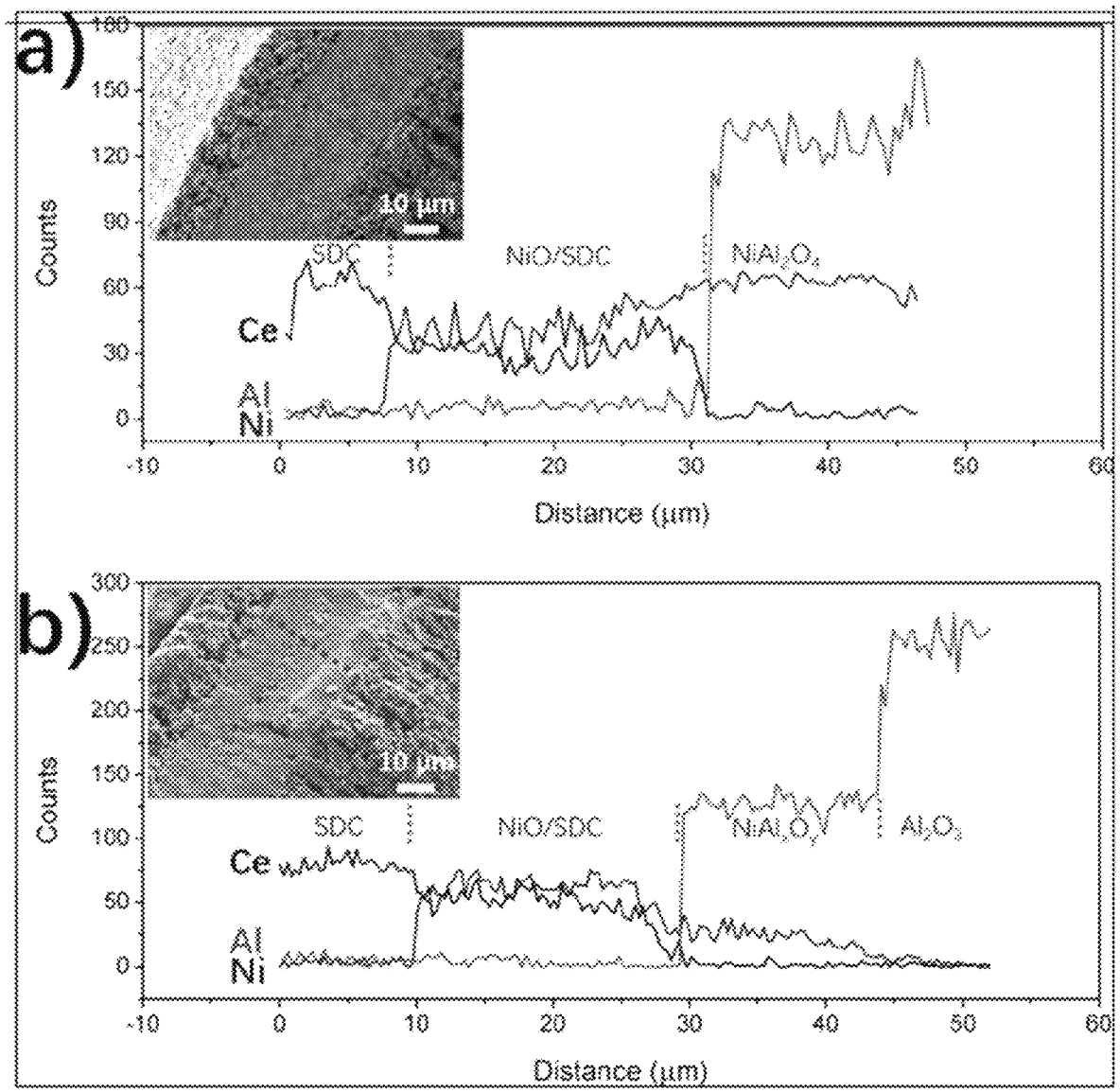
FIG. 4 shows intensity line element distribution scanning (EDS) analysis for Al, Ce, and Ni signals measured radially from cathode/electrolyte interface to the center of (a) NiAl$_2$O$_4$ spinel-supported cell, (b) pure alumina-supported cell.

Substrates with different materials have different sintering behaviors. This will affect fabrication process design of corresponding thin film SOFCs, especially sintering temperatures at different stages as demonstrated above. Sintering temperatures in turn could cause interdiffusion between neighboring layers, imposing great difficulties on fabrication of thin film cells. In particular, a thin NiO-SDC anode functional layer is sandwiched between a substrate and SDC electrolyte layer, and the densification of SDC electrolyte requires a relatively high sintering temperature, for example, 1450° C. This high sintering temperature would potentially induce diffusions of NiO phase in anode functional layer into both SDC electrolyte layer and the substrate. The loss of NiO phase could deteriorate performance of anode functional layer. To examine phase interdiffusion behavior, a line element distribution scanning (EDS) analysis was carried out for both $NiAl_2O_4$ spinel and pure $Al_2O_3$ substrate-supported thin film cells. FIG. 4 at a shows EDS results of $NiAl_2O_4$-supported cell. When measured radially from the cathode/electrolyte interface to the center of the cell, high content Ce element appears in the range of 0-8 μm. Ce content reduces to a relatively low level in the range of 8-32 μm and reaches zero beyond ~32 μm. Ni content is close to zero in the range of 0-8 μm and shows a step-increase in the range of 8-32 μm. A slight further Ni content increase is observed beyond 32 μm. Al content remains zero in the range of 0-32 μm but increases sharply to a high level beyond 32 μm. By combining EDS results for Ce, Ni, and Al elements, it is reasonable to assume that the dense SDC electrolyte is in the range of 0-8 μm, the NiO-SDC anode functional layer covers the range of 8-32 μm, while the $NiAl_2O_4$ substrate is beyond ~32 μm. For the pure alumina substrate-supported cell, see FIG. 4 at b, Ce only appears in the range of 0-29 μm with a relatively high level content in the range of 0-10 μm and a low level content in the range of 10-29 μm. NiO content increases from zero to a high level at ~10 μm and remains at this level in the range of 10-26 μm. Beyond ~26 μm, NiO content decreases exponentially and tapers off to zero at ~45 μm. Al content shows a step-increase from zero at ~29 μm and a further step-increase at ~44 μm, respectively. By combining Ce, Ni, and Al content distributions, one can see that the SDC electrolyte layer is in the range of 0-10 μm, while the NiO-SDC anode functional layer is in the region of 10-29 μm. NiO content distribution in the region of 29-45 μm corresponds to a profile of a diffusion process, implying that NiO in anode functional layer diffuses into alumina substrate during the high temperature sintering process. The secondary phase $NiAl_xO_y$, was formed in the region of 29-44 μm due to chemical reaction between NiO and $Al_2O_3$. In the literature, NiO:SDC weight ratio of 6:4 has been widely used for NiO-cermet anode. Here, a relatively high ratio of 7:3 was used to compensate for the loss of NiO in anode functional layer caused by its diffusion into alumina substrate during high temperature sintering process. It has been confirmed in our early work that $NiAl_2O_4$ remains chemical stability in a reducing atmosphere of wet hydrogen under 800° C. but is decomposed into Ni and $\alpha\text{-}Al_2O_3$ above 900° C.

Figure 5:
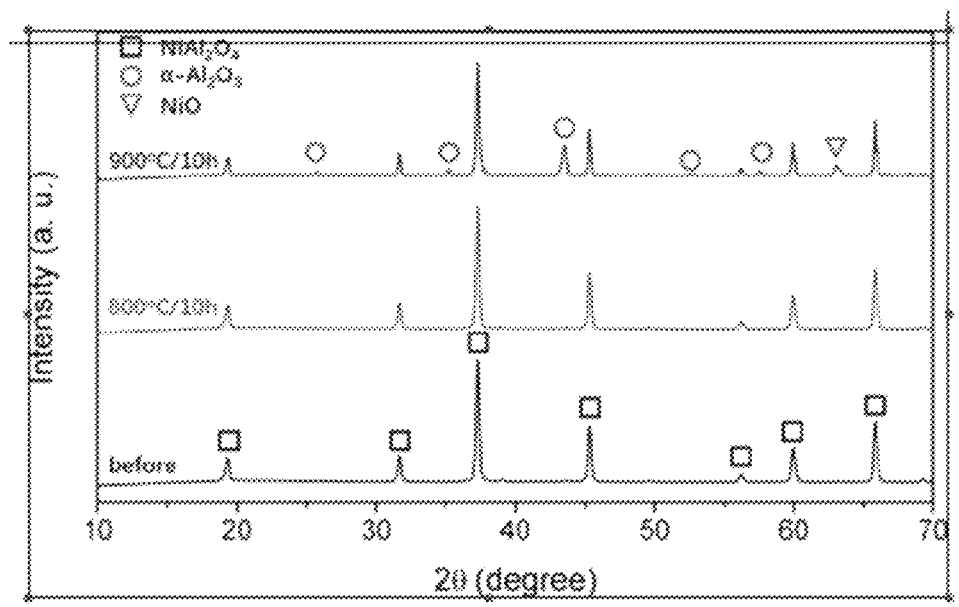
FIG. 5 shows XRD patterns of NiAl$_2$O$_4$ substrate after reducing at 600° C. in humidified hydrogen for 5 h, followed by treatment in dry methane for 10 h at 800 and 900° C. respectively, and cooling down in nitrogen for 10 min and then in air to room temperature.

To further examine chemical stability of $NiAl_2O_4$ substrate in methane at elevated temperatures, the sintered substrates were first reduced in humidified hydrogen at 600° C. for 5 h, followed by treatment in dry methane for 10 h at 800 and 900° C., respectively. The reduced samples were swept by nitrogen for 10 min and cooled down to room temperature in air. Phases of the treated substrates were then determined using XRD technique. As shown in FIG. 5, XRD pattern of the substrate treated at 800° C. is identical to that before the reducing treatment, indicating that $NiAl_2O_4$ substrate is chemically stable in this condition. Interestingly, after treatment at 900° C., XRD peaks corresponding to nickel oxide and $\alpha\text{-}Al_2O_3$ appeared, indicating that part of $NiAl_2O_4$ spinel phase was decomposed into Ni and $\alpha\text{-}Al_2O_3$, and the Ni phase was oxidized during the cooling down process. The following electrochemical tests of the cells will confine the operating conditions within the scope against decomposition of $NiAl_2O_4$ substrate.

Figure 6:
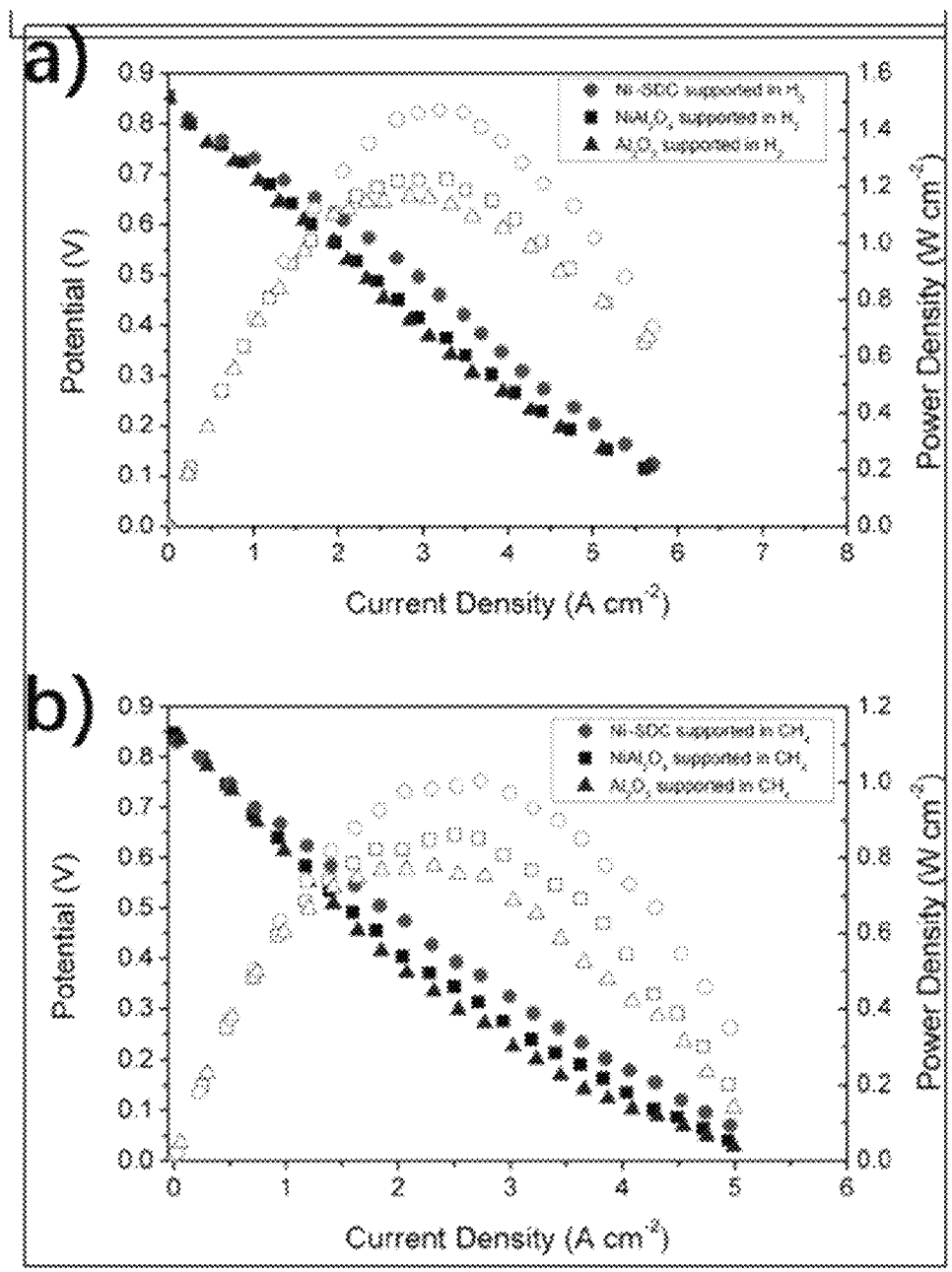
FIG. 6 shows V-I and power density curves at 700° C. of anode-supported microtubular cell Ni-SDC/SDC/PBCO, NiAl$_2$O$_4$ spinel-supported and pure alumina-supported microtubular thin film cell Ni-SDC/SDC/PBCO, (a) in humidified hydrogen, (b) in direct dry methane.
Figure 7:
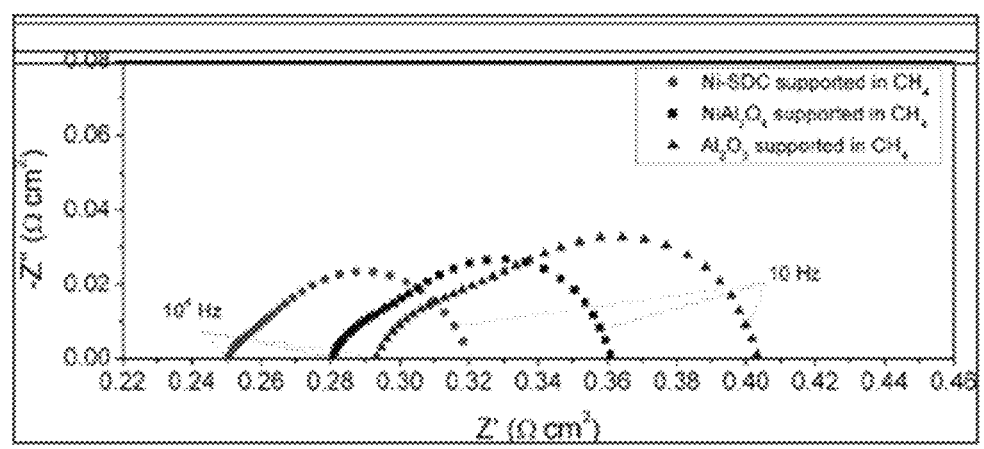
FIG. 7 shows impedance spectra under OCV conditions at 700° C. of anode-supported microtubular cell Ni-SDC/SDC/PBCO, NiAl$_2$O$_4$ spinel-supported and pure alumina-supported microtubular thin film cell Ni-SDC/SDC/PBCO in direct methane.

Anode electrodes of fabricated microtubular cells were reduced at 600° C. in humidified hydrogen for 5 h before electrochemical testing, allowing complete reduction of NiO to Ni in anode functional layer. FIG. 6 at a shows electrochemical performance of the three cells at 700° C. when humidified hydrogen (~3% $H_2O$, flow rate 30 mL min$^{-1}$) was used as fuel and ambient air as oxidant. The Ni-SDC-supported cell (cell-1) obtained a peak power density (Pmax) of 1.50 W cm$^{-2}$. The $NiAl_2O_4$-supported cell (cell-2) and alumina-supported cell (cell-3) demonstrated peak power densities of 1.23 and 1.15 W cm$^{-2}$ at 700° C., respectively. When direct dry methane is used as fuel, cell-1, cell-2, and cell-3 showed Pmax of 1.08, 0.87, and 0.79 W cm$_{-2}$ at 700° C., respectively, see FIG. 6 at b, which are among the best reported in open literatures. Methane utilization rates by the cells are also evaluated. To simplify the analysis, fuel utilization rate is calculated based on complete electrochemical oxidation of methane ($CH_4 + 4O_2 \longrightarrow CO_2 + 2H_2O + 8e^-$):

$$U_f = \frac{I}{8F \times n_{CH_4,inlet}} \times 100 \quad (1)$$

where Uf denotes fuel utilization rate; I the electric current generated by cell; F the Faraday constant (A s mol$^{-1}$); and $n_{CH4,inlet}$ the inlet molar flow rate of methane (mol s$^{-1}$). When electrical current I at maximum power density was chosen for the calculation, methane utilization rates of 6.4%, 6.2%, and 6.0% were achieved at 700° C. for cell-1, cell-2, and cell-3, respectively. Electrochemical impedance spectra (EIS) of the three cells under open circuit voltage (OCV) conditions at 700° C. in dry methane are displayed in FIG. 7. The intercept of EIS arc with real axis at high frequency represents cell ohmic resistance ($R_o$), while the difference between low frequency and high frequency intercept indicates cell polarization resistance ($R_p$) contributed by both anode and cathode electrode. Table 2, see FIG. 12, summarizes various performance of the three cells. OCVs of 0.83-0.88 V were obtained with dry methane fuel at 700° C., which shows a slight increase with decreasing operating temperature from 700 to 600° C. The OCVs are lower than those of YSZ-electrolyte based cells due to the well-known fact that Ce in doped-ceria electrolyte will be partially reduced from 4+ to 3+, causing electronic current leakage. Ohmic resistances ($R_o$) of the cells ordered from low to high are 0.25 Ωcm$^2$ (cell-1), 0.28 Ωcm$^2$ (cell-2), and 0.30 Ωcm$^2$ (cell-3) at 700° C., respectively. The slight differences might be induced by variations of fabrication processes, especially the SDC electrolyte in cell-3 is thicker than those of both cell-1 and cell-2. With decreasing operating temperature from 700 to 600° C., ohmic resistance increased a little bit mainly because of thermal activation nature of ionic conducting process through electrolyte and electrodes. Polarization resistances ($R_p$) of the cells show similar trend, 0.07 Ωcm² (cell-1), 0.08 Ωcm² (cell-2), and 0.11 Ωcm² (cell-3) at 700° C., respectively. Polarization resistance is contributed by both anode and cathode electrode. Since the cathode was fabricated using the same material and process, it is reasonable to assume that polarization difference of the cells is mainly induced by different anode electrodes. These include different electrode architectures and different Ni:SDC ratios, their distributions, and the density of TPB sites in anode/functional layers induced by different fabrication processes especially sintering temperature at different stages. When operating temperature was reduced from 700 to 600° C., polarization resistance correspondingly showed a little bit of increases due to thermal activation nature of electrode process.

Figure 8:
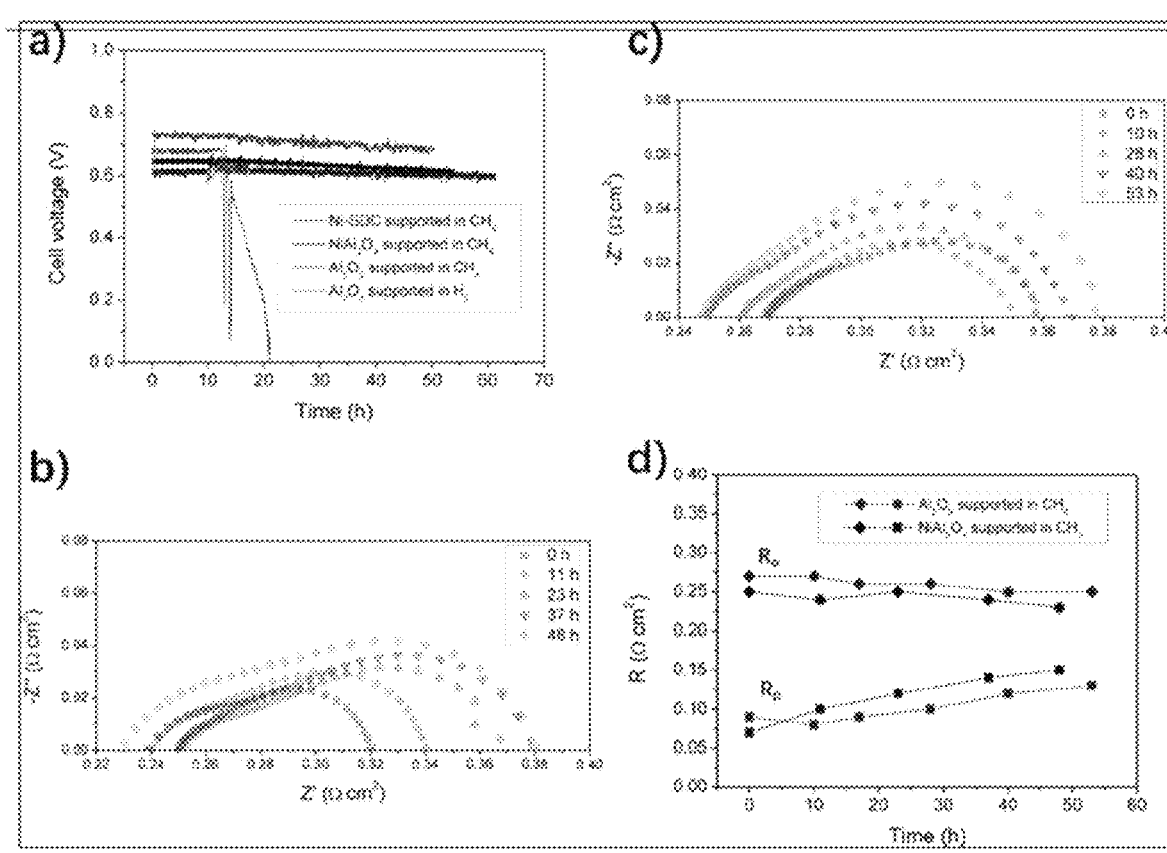
FIG. 8 shows short-term stability of three type of cells at 700° C. under load current density of 1.0 A cm$^{-2}$: (a) Time history of cell voltage in direct methane and humidified hydrogen, time history of impedance spectra for (b) NiAl$_2$O$_4$ spinel-supported and (c) pure alumina-supported cells, (d) time history of ohmic resistance ($R_o$) and polarization resistance ($R_p$) of the cells.

Short-term stability (50-60 h) test was performed for the three types of cells in direct dry methane fuel at 700° C. A loading current density of 1.0 A cm−2 was applied to the cell, cell voltage was monitored, and EIS was measured periodically during cell operations. Time histories of cell voltages, EIS, and ohmic/polarization resistances are shown in FIG. 8. The voltage of cell-1 remained at ~0.69 V for the first ~13 h, followed by severe oscillations and then quickly died out to zero. The voltage of cell-2 remained at ~0.65 V for the first 15 h and then slightly deteriorated during the rest of the course with a voltage degradation rate of ~0.95 mV h$^{-1}$. The cell-3 demonstrated a stable voltage at ~0.61 V in the first 20 h and then showed a slight voltage decrease with degradation rate of ~0.31 mV h$^{-1}$. Obviously, cell-3 demonstrated the best stability in direct dry methane fuel. For comparison, short term stability of cell-3 in humidified hydrogen was also carried out and shown in FIG. 8 at a. A slight degradation is observed during the course of the test, which could be attributed to material (e.g., cathode material) and microstructure evolutions. Comparing the stability of cell-3 in direct dry methane and humidified hydrogen, it is reasonable to assume that direct dry methane has little effect on the stability of cell-3. This further implies that little carbon was deposited in either anode functional layer or alumina substrate in cell-3. Because of the perturbation voltage applied by impedance measurement process, small voltage spikes can be observed in the time history of cell voltages. The EIS results, see FIG. 8 at b and c, indicate that ohmic resistance of both cell-2 and cell-3 showed a slight decrease during the course of short-term test; however, their polarization resistances increased, see FIG. 8 at d. Short-term stability of the three cells under OCV conditions was also carried out in direct dry methane at 700° C. and shown in FIG. 9. Obviously the cells demonstrated similar stability behaviors to those under the loading current density of 1.0 A cm$^{-2}$. The cell-1 demonstrated a relatively stable voltage of ~0.85 V in the first 5 h and experienced very long time degradations with severe oscillations, followed by complete extinction of performance at ~30 h. Both cell-2 and cell-3 demonstrated very good stability during the course of the test. It appears that cell-3 showed the best stability.

Figure 10:
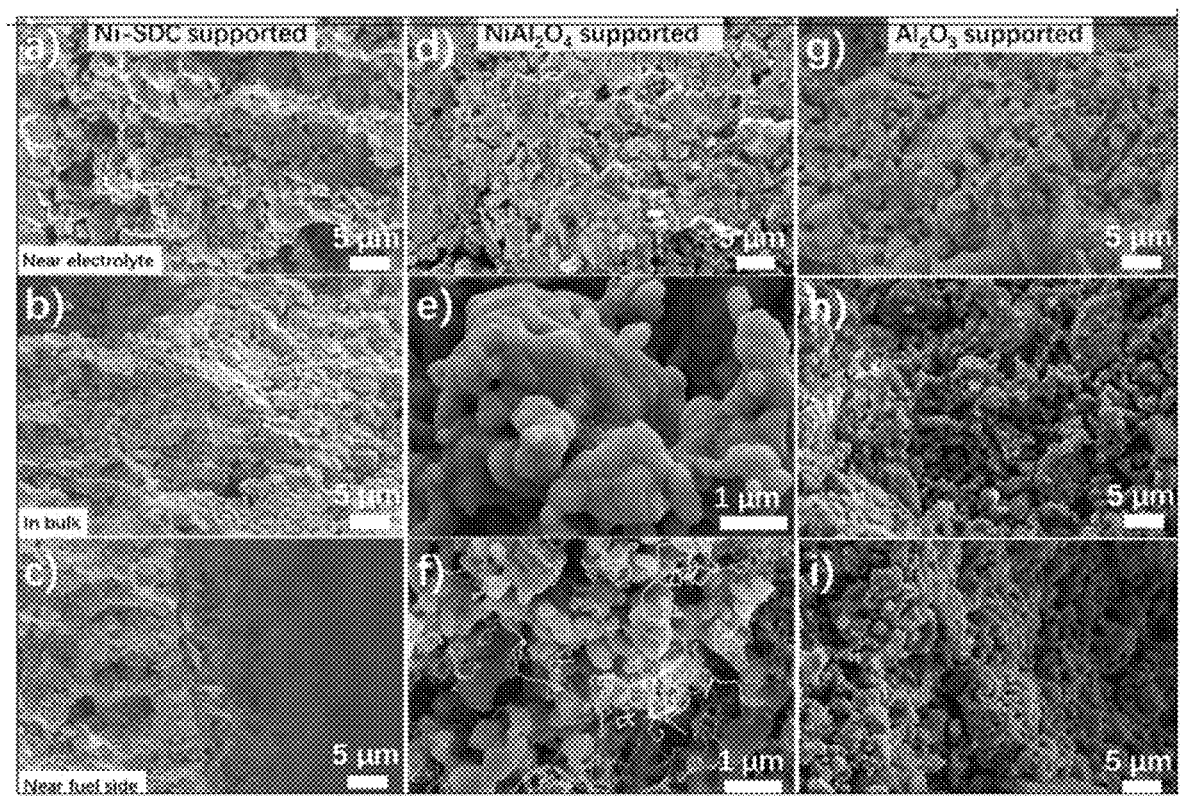
FIG. 10 shows SEM micrographs of post-stability test cells in direct dry methane at 700° C. at three different locations in anodes: at electrolyte/anode interface, in the substrate bulk, and near substrate inner surface. (a-c) Anode-supported cell Ni-SDC/SDC/PBCO; (d-f) NiAl$_2$O$_4$ spinel-supported thin film cell NiO-SDC/SDC/PBCO; (g-i) pure alumina-supported thin film cell NiO-SDC/SDC/PBCO.
Figure 13:
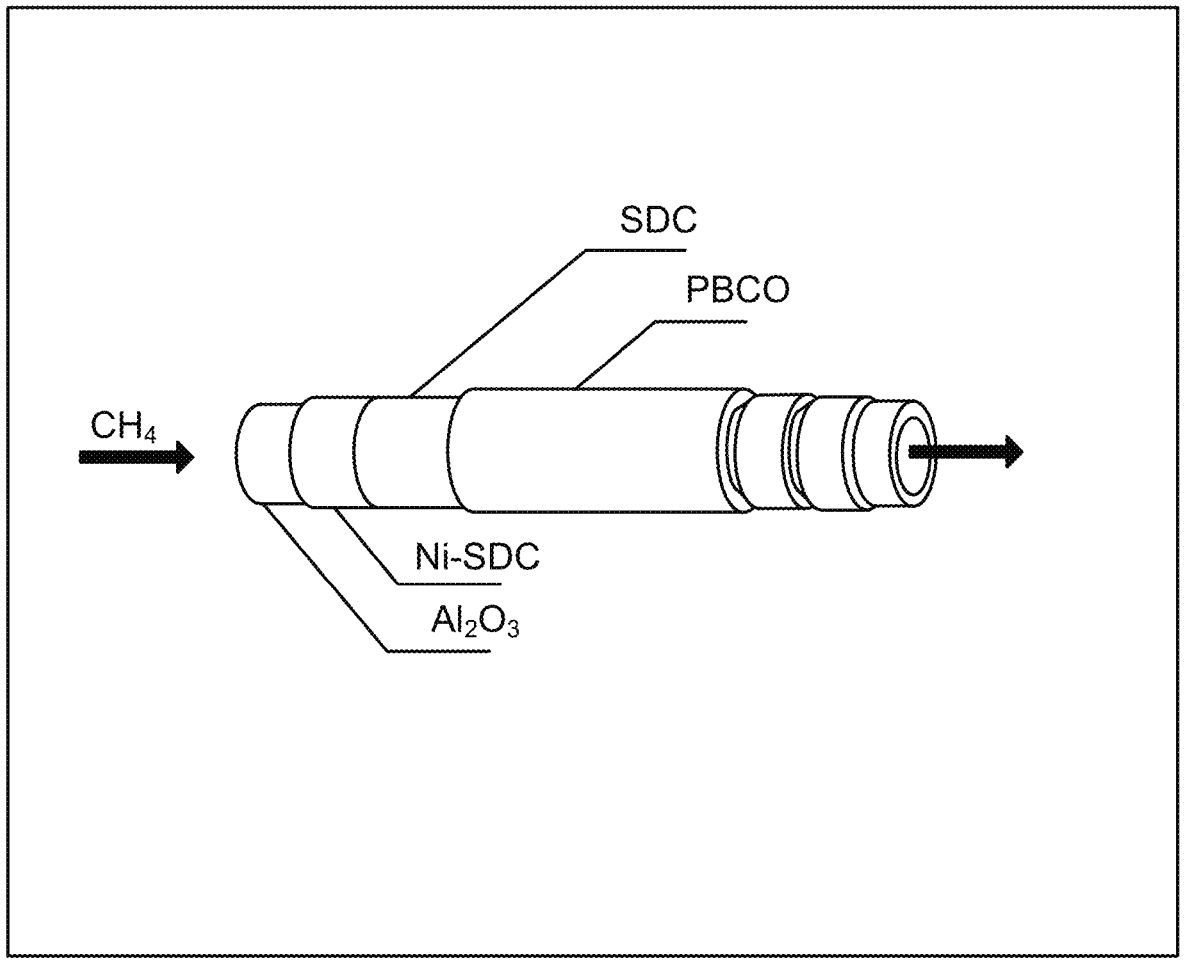
FIG. 13 shows an illustration of one embodiment of a SOFC of the current disclosure.
Figure 14:
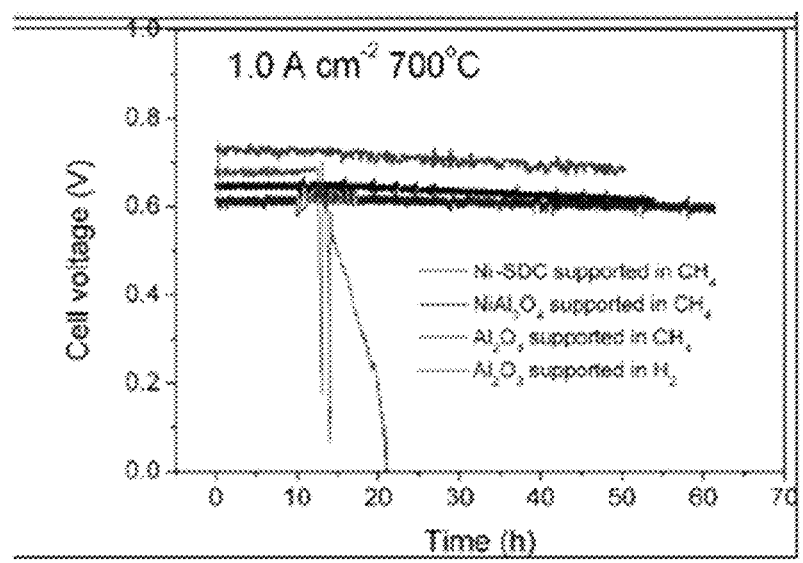
FIG. 14 shows a graph of cell voltage versus time for the SOFC of FIG. 13.
Figure 13:
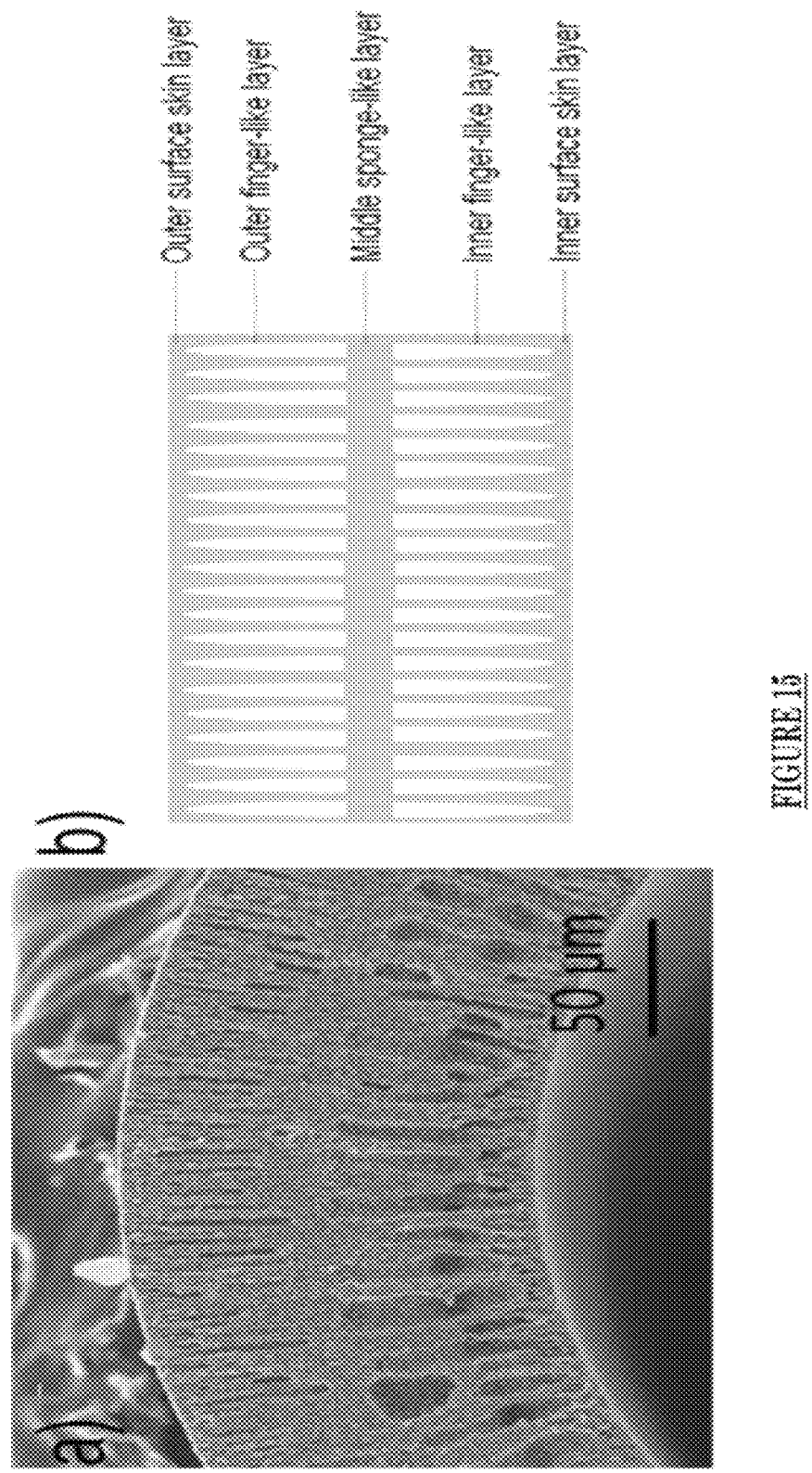

To better understand above behaviors of performance stability, microstructures of post-test cells (under loading current density of 1.0 A cm$^{-2}$) were characterized using SEM technique at three typical locations in anode electrode, for example, near electrolyte/anode interface, in the bulk of anode substrate, and near inner surface of microtubular cell. FIG. 10 at a-c shows microstructures of Ni-SDC anode-supported cell. It can be seen that no carbon deposition can be found near electrolyte/anode interface, see FIG. 10 at a. A significant amount of carbon particles was deposited on Ni particles in the bulk of anode substrate, see FIG. 10 at b. Interestingly, a layer of carbon needles/whiskers (~5 μm thickness) was formed on inner surface of the substrate, see FIG. 10 at c. In the NiAl$_2$O$_4$-supported cell, see FIG. 10 at d-f, no carbon deposition was observed on the Ni particle surface in the anode functional layer, see FIG. 10 at d. A considerable amount of carbon particles was detected in the bulk of NiAl$_2$O$_4$ spinel substrate, see FIG. 10 at e. Carbon filaments (nanofibers) were formed on the inner surface of NiAl$_2$O$_4$ spinel substrate, see FIG. 10 at f. However, in the alumina-supported cell, no carbon deposition can be found in either the anode functional layer, substrate bulk, or substrate inner surface, see FIG. 10 at g-i. By comparing three types of cells, it is obvious that no carbon deposition was formed in anode functional layer in either type of cells. As mentioned above, electrochemical reactions (i.e., electrochemical oxidization of fuel species) are mainly confined within a narrow effective reaction zone near electrolyte/anode interface, where a significant amount of O$^{2-}$ flux was migrated from cathode side and H$_2$O (steam) was produced under current loading of 1.0 A cm$^{-2}$ through electrochemical oxidizations of hydrogen or methane (H$_2$+O_→H$_2$O+2e−, CH$_4$+4O$_2$_→CO$_2$+2H$_2$O+8e$^-$). High oxygen ionic flux in this zone facilitates a relatively high O/C ratio to remain, effectively inhibiting carbon formation through direct electrochemical oxidization of carbon (C+O$^{2-}$→CO$_2$+2e$^-$). Further, high steam content in this region could also reduce/eliminate deposited carbon and produce syngas, prohibiting carbon formation via direct carbon gasification reaction (C+H$_2$O→H$_2$+CO). In the bulk region of the anode substrate, little O$^{2-}$ flux is available from the cathode side, and steam content is relatively low because a majority of produced steam would be consumed in anode functional layer near the electrolyte through steam reforming reaction (CH$_4$+H$_2$O↔CO+3H$_2$) and water-gas shift reaction (CO+H$_2$O↔CO$_2$+H$_2$). In the Ni-SDC anode substrate (cell-1), plenty of Ni particles exists. The excellent catalytic property of Ni could lead to direct decomposition of methane (CH$_4$→C+2H$_2$), and likely Boudouard reaction (2CO→CO$_2$+C) and hydrogenation reaction (CO+H$_2$→H$_2$O+C) if sufficient CO exists. These three catalytic reactions directly produce carbon. As a consequence, a considerable amount of carbon was deposited on the surface of Ni particles as observed in FIG. 10 at b. However, no carbon deposition was observed on the surface of SDC particles. The high resistance of SDC to carbon deposition originates from the oxygen storage and mobility capability of ceria, which can store and release reversibly a large amount of oxygen, enabling gasification of the carbon deposits. In NiAl$_2$O$_4$ spinel substrate (cell-2), even though NiAl$_2$O$_4$ phase is catalytically inactive for decomposition of methane and potential Boudouard and hydrogenation reactions, a considerable amount of carbon deposition was still observed in the bulk of the substrate, see FIG. 10 at e. When fabricating the NiAl$_2$O$_4$ substrate, a stoichiometric amount of NiO and Al$_2$O$_3$ was mechanically mixed, and NiAl$_2$O$_4$ phase in the substrate was formed in situ during high temperature sintering process. However, mechanical mixing cannot guarantee that the amount of NiO and Al$_2$O$_3$ is stoichiometric everywhere in the substrate especially at microscale. As a consequence, some tiny NiO phase below the level detectable by XRD could still exist and is distributed in the substrate. After reducing, the Ni phase in the substrate catalyzes methane and CO, causing carbon deposition in the bulk NiAl$_2$O$_4$ substrate during short-term stability test, see FIG. 10 at e. Since pure alumina is catalytically inert material, it is less likely to form carbon deposition on alumina particles in the bulk alumina substrate, which is verified by the SEM image in FIG. 10 at h. In the inner surface region of microtubular substrate, methane concentration is very high, and oxygen ions from cathode side and steam produced by electrochemical oxidization of fuel in functional layer are less likely to be available. Such an atmosphere facilitates direct decomposition of methane catalyzed by Ni phase. As a consequence, a thick layer of carbon needle/whisker (~5 μm) was formed on inner surface of the Ni-SDC substrate (FIG. 10 at c). This layer of carbon would block methane fuel from diffusion into anode substrate and functional layer, causing depletion of methane fuel for electrochemical reactions, and rapid voltage oscillation and extinction of Ni-SDC anode-supported cell as observed in FIG. 8 at a. For $NiAl_2O_4$ substrate-supported cell, since a tiny Ni could be available to catalyze dry methane, a little bit of carbon filaments (nanofibers) was formed on inner surface of the substrate, see FIG. 10 at f. As observed in FIG. 8 at a, the degradation rate of the cell-2 is faster than that of cell-3. Given the fact that materials and structure are the same/quite similar except for the material of anode substrate and carbon nanoparticle/fiber deposits occurred in the substrate of cell-2, it is reasonable to assume that faster degradation rate of cell-2 is induced by carbon deposition in $NiAl_2O_4$ substrate, and carbon deposition would cause long-term block and disruption of $NiAl_2O_4$ spinel substrate. It is noteworthy that the stability of electrode microstructures and cathode material also affects stability of the cells. Ohmic resistances of cell-2 and cell-3 decreased with time during the short-term stability test, see FIG. 8 at d, which is likely induced by certain microstructure evolution. Polarization resistances of both cell-2 and cell-3 increased with time, see FIG. 8 at d, which are contributed by both anode and cathode electrode. Without considering carbon deposition effect in the anode, degradation rates of cell-2 and cell-3 should be similar. However, polarization degradation rate of cell-2 is faster than that of cell-3, highlighting the effect of carbon deposition in the anode.

The time history of polarization resistance is consistent with that of cell voltage. It should be mentioned that under a high current density loading of 1.0 A $cm^{-2}$, oxygen flux and produced steam are relatively high near the anode/electrolyte interface. This condition facilitates to prevent carbon deposition. Additionally, steam generated near anode/electrolyte interface would partially flow into the substrate and mix with inflow methane. The mixture of steam and methane would further improve the O/C ratio when methane reaches catalytically active anode/electrolyte interface, suppressing carbon formation in this region. When short-term stability test was carried out under open circuit voltage condition, Ni-SDC anode supported cell remained a relatively stable OCVs in a short-time of first 5 h. The cell then experienced OCV oscillations for about 15 h and extinct at ~30 h, see FIG. 9.

Figure 9:
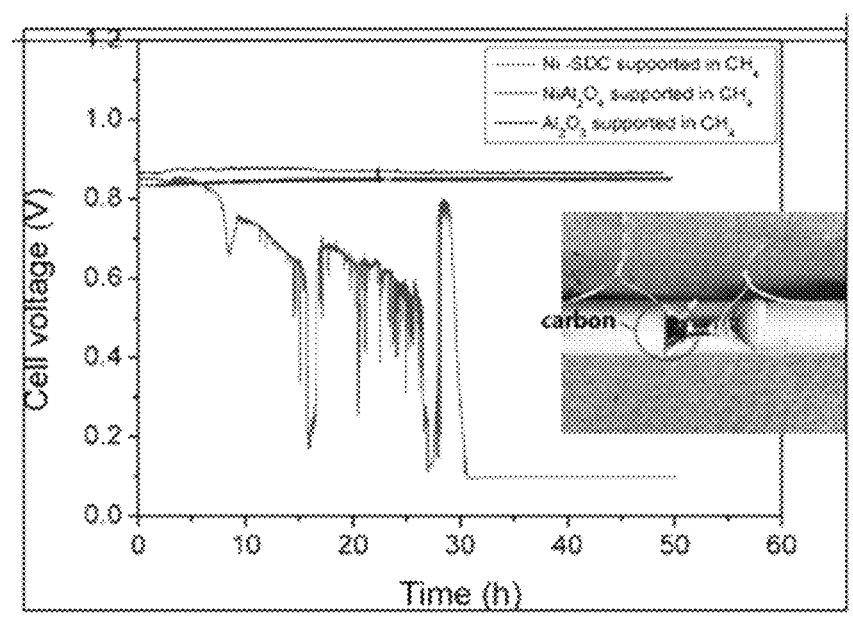
FIG. 9 shows time history of open circuit voltages of the three type of cells in direct dry methane at 700° C. in a short-term stability test. The insert is the image of post-test anode-supported cell NiO-SDC/SDC/PBCO damaged by carbon deposited near inlet of anode electrode.

Post-test sample clearly showed that very severe carbon deposition occurred near the inlet of the cell. The accumulation of carbon deposition at the inlet severely limited methane flow. The OCV oscillations are likely induced by the competing effects between carbon deposition and methane flow until anode inlet is completely blocked. The insert in FIG. 9 showed that the anode inlet was blocked and damaged by carbon deposition. Interestingly, both cell-2 and cell-3 were very stable in dry methane under OCV conditions, and the cell-3 showed the most stable short-term performance.

Different from cell-1, no carbon deposition at anode inlet was observed due to catalytic inert nature of $NiAl_2O_4$ spinel and alumina substrates. Overall, alumina substrate-supported thin film SOFC is able to effectively prevent carbon deposition and obtain excellent stability in direct dry methane under both high current loading and OCV conditions without sacrificing electrochemical performance.

Three types of microtubular SOFCs were successfully fabricated, including traditional anode-supported cell Ni-SDC/SDC/PBCO, $NiAl_2O_4$ spinel substrate-supported, and pure alumina substrate-supported thin film cell Ni-SDC/SDC/PBCO. $NiAl_2O_4$ spinel phase in the substrate was formed in situ with a stoichiometric amount of NiO and $Al_2O_3$ during the high temperature sintering process. Microtubular substrates featured radially well-aligned microchannels open at the inner surface of the substrate, enabling facile fuel/gas diffusion. Both pure alumina and $NiAl_2O_4$ spinel substrate-supported thin film cells demonstrated high electrochemical performance in both humidified hydrogen and direct dry methane, comparable to that of traditional Ni-SDC anode-supported cell and among the best in open literature. Short-term durability test in direct dry methane under high current density loading indicates that traditional Ni-SDC anode supported cell showed fast performance degradation, the stability of $NiAl_2O_4$ spinel-supported cell was significantly improved, while alumina-supported cell demonstrated very good short-term stability and is the best among the three cells. Little carbon deposition was found at the electrolyte/anode interface due to high oxygen ionic flux from the cathode side and steam produced from electrochemical oxidization of fuel species. A considerable amount of carbon deposition occurred in the bulk and inner surface of Ni-SDC substrate due to excellent catalytic property of Ni and less likely available oxygen ions and steam. A slight carbon deposition was observed in the bulk and inner surface of $NiAl_2O_4$ spinel substrate due to a tiny amount of NiO phase unreacted with $Al_2O_3$ during sintering process. No carbon deposition was found in alumina substrate due to its catalytic inert nature. Short-term durability test in direct methane under OCV condition demonstrated similar stability behaviors to those under high current density loading condition. Carbon deposits in the substrates block fuel/gas diffusion caused different degrees of performance degradations of Ni-SDC anode-supported cell and $NiAl_2O_4$ spinel-supported cell. The results clearly demonstrate advantages of the novel alumina substrate-supported thin film SOFC including significant reduced capital cost, improved robustness, high electrochemical performance, and especially the capability of effective carbon deposition resistance while still using Ni-cermet for anode functional layer.

Further, a phase inversion-based dual-layer co-extrusion approach was advanced to fabricate micro-channel array structured micro-tubular solid oxide fuel cells (MT-SOFCs). The inner graphite layer was used as a sacrificial layer to eliminate the middle sponge-like layer and inner surface dense skin layer, which were normally formed using the single layer extrusion method. As a result, the micro-channel array generated in the outer layer was a more open structure and facile fuel/gas diffusion was obtained. The fuel/gas permeability of such an anode substrate Ni—$Ce_{0.8}Sm_{0.2}O_{1.9}$ (Ni-SDC) was ~9 times that of an anode substrate fabricated using the phase inversion based single layer extrusion method. The open circuit voltages (OCVs) of the corresponding cell Ni-SDC/SDC/$PrBaCo_2O_{5+\delta}$ were 0.89 V-0.85 V at 500-600° C., much higher than those of other SDC electrolyte based MT-SOFCs. The peak power density of the cell was ~1484 mW $cm^{-2}$ at 600° C., approximately 1.5 times that of a similar cell with an anode substrate fabricated from the single layer extrusion method. This is also the highest performance among the SOFCs with the same material system in open literature. The fuel utilization rate was also significantly improved in different degrees depending on the supplied inlet fuel flow rates.

The solid oxide fuel cell (SOFC) is an environmentally-friendly and highly-efficient energy conversion technology that converts chemical energy in fuels directly to electricity. This technology has wide stationary and mobile applications and is of interest in future spacecraft for power, or, as an electrolyzer for life support applications. Compared to electrolyte- and cathode-supported designs, anode-supported SOFCs may significantly reduce ohmic resistance loss and polarization resistance loss, and therefore are being widely employed. Among various SOFC configuration designs, micro-tubular SOFCs (MT-SOFCs) have attracted increasing attention due to the advantages of good thermal cycling stability, good thermal shock resistance, easy sealing, high volumetric power density, and quick start-up capability.

However, micro-tubular design also imposes great challenges on fabrication process designs, especially when the diameters of micro-tubes are required to reach millimeter or sub-millimeter scales to meet volumetric power density goals. Recently, the phase inversion based spinning method has been successfully demonstrated for the fabrication of anode-supported MT-SOFCs.

Typical microtubular anode-substrates prepared with this method have the feature of multiple-layered microstructures, where a sponge-like layer is sandwiched by two thick finger-like layers on either side, and the inner and outer surfaces of the micro-tube are covered by thin but relatively dense skin layers, see FIG. 15. The thick finger-like layers are embedded with large continuous finger-like pores perpendicular to the sponge-like layer, whereas both the sponge-like layer and the skin layers contain small and non-continuous pores, and the resultant porosity is very low. The anode-substrates with such microstructures, albeit unique, show disadvantages for facile fuel/gas transport. This in turn limits electrochemical performance of MT-SOFCs especially at the operating conditions of large current densities.

Several efforts have been made toward eliminating either the middle-sponge-like layer or relatively dense inner surface skin layer of microtubular anode substrate. For example, slurry viscosity was optimized to reduce the thickness of mid sponge-like layer. Unfortunately, this method cannot completely eliminate the sponge-like layer and the microstructure feature of finger-like voids was lost. See, T. Liu, C. Ren, S. M. Fang, Y. Wang, and F. L. Chen, *Acs Appl Mater Inter,* 6, 18853 (2014). Co-extrusion technique was developed to extrude anode-substrate/electrolyte assembly in one-step by the Li group. As a result, the electrolyte layer was attached to the sponge-like layer. While this method may simplify the steps for cell fabrication, it also led to finger-like voids on the surface of the electrolyte, and high sintering temperature was needed to densify the electrolyte layer. This in turn could cause insufficient porosity in the anode substrate and the electrochemical performance of the corresponding cell was limited by mass transport process at high current densities. See, M. H. D. Othman, N. Droushiotis, Z. T. Wu, G. Kelsall, and K. Li, *J Power Sources,* 196, 5035 (2011) and 28. N. Droushiotis, M. H. D. Othman, U. Doraswami, Z. T. Wu, G. Kelsall, and K. Li, *Electrochem Commun,* 11, 1799 (2009). It should be noted that none of above two methods is able to eliminate inner surface skin layer of the anode substrate.

Recently, a multi-step dip-coating method was developed to fabricate anode substrate using a glass rod as a mold. A graphite layer was clip-coated onto the glass rod as the first layer of anode substrate. By burning out the graphite layer at the sintering stage, the inner surface skin layer of anode substrate was eliminated. See, L. Chen, M. T. Yao, and C. R. Xia, Electrochem Commun, 38, 114 (2014).

Although this technique is simpler than phase-inversion based extrusion technique, it is hard to control the uniformity of each layer due to the viscosity and gravity of slurries. It is also time-consuming and essentially not suitable for high volume production. The Dong group successfully eliminated the skin layer using a mesh-templating method, see X. Shao, D. H. Dong, G. Parkinson, and C. Z. Li, *J Mater Chem A,* 1, 9641 (2013), but the method is only applicable for planar type SOFC fabrication. Using dimethyl sulfoxide as internal coagulant in phase inversion extrusion process, Li group obtained open channels/pores in microtubular anode substrate. See, T. Li, Z. T. Wu, and K. Li, *J Power Sources,* 251, 145 (2014).

It is worth noting that MT-SOFCs studied so far mainly employed yttria stabilized zirconia (YSZ), see C. C. Chen, M. F. Liu, L. Yang, and M. L. Liu, *Int J Hydrogen Energ,* 36, 5604 (2011)., W. N. Yin, B. Meng, X. X. Meng, and X. Y. Tan, *J Alloy Compd,* 476, 566 (2009), K. Kanawka, F. Dal Grande, Z. T. Wu, A. Thursfield, D. Ivey, I. Metcalfe, G. Kelsall, and K. Li, *Ind Eng Chem Res,* 49, 6062 (2010), X. X. Meng, N. T. Yang, X. Gong, Y. M. Yin, Z. F. Ma, X. Y. Tan, Z. P. Shao, and S. M. Liu, *J Mater Chem A,* 3, 1017 (2015), C. L. Yang, W. Li, S. Q. Zhang, L. Bi, R. R. Peng, C. S. Chen, and W. Liu, *J Power Sources,* 187, 90 (2009), D. Panthi and A. Tsutsumi, *Sci Rep-Uk,* 4 (2014), and H. J. Son, T. H. Lim, S. B. Lee, D. R. Shin, R. H. Song, and S. H. Kim, *Ecs Transactions,* 7, 543 (2007), and gadolinium doped ceria (GDC), see M. H. D. Othman, N. Droushiotis, Z. T. Wu, G. Kelsall, and K. Li, *Advanced Materials,* 23, 2480 (2011)., N. Sammes, J. Song, B. Roy, K. Galloway, T. Suzuki, M. Awano, and A. M. F. Serincan, *Mater Sci Forum,* 638-642, 1152 (2010) and B. B. He, Y. H. Ling, J. M. Xu, L. Zhao, and J. G. Cheng, *J Power Sources,* 258, 391 (2014), as electrolytes. Only a couple of works have utilized samarium doped ceria (SDC) as the electrolyte for MT-SOFCs, see J. Xiao, Z. T. Tao, Z. W. Zhu, W. Liu, and W. P. Sun, *Int J Appl Ceram Tec,* 9, 1064 (2012) and M. Morales, M. A. Laguna-Bercero, M. E. Navarro, F. Espiell, and M. Segarra, *Rsc Adv,* 5, 39350 (2015), and the corresponding open circuit voltages (OCVs) were much lower than those predicted by the Nernst equation. For example, an MT-SOFC with 20 μm SDC electrolyte layer only obtained the OCVs of 0.74-0.71 V at 500-600° C., see J. Xiao, Z. T. Tao, Z. W. Zhu, W. Liu, and W. P. Sun, *Int J Appl Ceram Tec,* 9, 1064; a recent study of the MT-SOFC with 15 μm SDC electrolyte layer only showed the OCVs of 0.73 V and 0.68 V at 600° C. and 650° C. respectively. See, M. Morales, M. A. Laguna-Bercero, M. E. Navarro, F. Espiell, and M. Segarra, *Rsc Adv,* 5, 39350 (2015).

Given the fact that planar SOFCs with thin SDC electrolytes may obtain higher OCVs, e.g., close to 0.9 V at 600° C., see H. P. Ding and X. J. Xue, *Int J Hydrogen Energ,* 35, 4316 (2010), these results imply that it would be very difficult to fabricate a dense thin SDC electrolyte layer on a microtubular anode substrate. Since SDC is an important intermediate temperature electrolyte material, it is worth to further study the fabrications of thin SDC electrolyte based MT-SOFCs to improve OCVs, providing the potential to achieve high electrochemical energy conversion efficiency.

Inspired by above studies, here we present an innovative advancement of phase-inversion based dual-layer co-extrusion method to fabricate micro-channel array structured Ni-SDC anode substrate, where the sponge-like layer and inner surface skin layer induced by the existing phase-inversion based extrusion methods can be completely eliminated. The micro-channel array structures in the anode-substrate are well aligned radially, and exhibit a high degree of connectivity through tube surface into the interior of the tube. Built upon the Ni-SDC anode substrate, an intermediate temperature MT-SOFC Ni-SDC/SDC/PrBaCo$_2$O$_{5+\delta}$ with ~10 μm dense SDC electrolyte was fabricated. With humidified hydrogen as the fuel and ambient air as oxidant, the cell obtained the OCVs of 0.89 V, 0.87 V, and 0.85 V at 500° C., 550° C., and 600° C. respectively. The electrochemical performance of the cell was systematically studied in intermediate temperature range of 500-600° C. The performance improvement due to facile fuel/gas transport in anode substrate was highlighted. The peak power density of the cell reached ~1484 mW cm$^{-2}$ at 600° C., approximately 1.5 times that of a similar cell with an anode substrate fabricated from the single layer extrusion method. To our best knowledge, both the OCVs and peak power densities of the developed cell are the highest among the MT-SOFCs with SDC as the electrolyte in open literature.

EXPERIMENTAL

Materials and synthesis methods.—Commercial NiO (Fine grade, FCM, USA) and SDC (Ce$_{0.8}$Sm$_{0.2}$O$_{1.9}$ Tape cast grade, FCM, USA) anode powders were mixed in a weight ratio of 6:4. The anode powder mixture was then ball-milled in ethanol (anode powders: ethanol=30 wt. %: 70 wt %) for 2 hours and subsequently dried at 80. C overnight. Graphite powder (MCMB, MTI Corporation, USA) was used as the inner layer material during the co-extrusion of anode substrate. Polyethersulfone (PESf) (Veradel 3000P, Solvay Specialty Polymers, USA) with a molecular weight of ~3000 g mol−1, Nmethyl-2-pyrrolidone (NMP) (HPLC grade, Sigma-Aldrich, USA), and polyvinylpyrrolidone (PVP) (K30, CP, Sinopharm Chemical Reagent Co., China) with a molecular weight of 4000 g mol−1 were used as the polymer binder, the solvent, and the dispersant, respectively, to prepare an organic solution. Tap water was used as the internal and external coagulants for preparation of the micro-tubular anode substrate, and all preparation processes were carried out at room temperature. PrBaCo$_2$O$_{5+\delta}$ (PBCO) powders were synthesized using Pechini process. See, H. P. Ding and X. J. Xue, Electrochim Acta, 55, 3812 (2010). Briefly, Pr$_6$O$_{11}$ was first dissolved in nitric acid; the calculated amount of Ba(NO$_3$)$_2$.9H$_2$O and Co(NO$_3$)$_2$.6H$_2$O was dissolved in EDTA aqueous solution under heating and stirring conditions. An appropriate amount of citric acid (molar ratio of EDTA, citric acid and total metal ions was 1:1:1) was then added in the solution. The pH value of the mixture was controlled around 8.0 by adding aqueous ammonia into the solution. After converted into viscous gel under heating and stirring conditions, the solution was ignited to flame and result in ash. The resulting ash-like material was afterwards calcined in air at 1100° C. for 5 h to form PBCO phase. Fine PBCO powders (40.0 wt %) were ground with ethyl-cellulose and α-terpineol (6.0 wt. %: 54.0 wt %, Alfa Aesar, USA) to form a cathode ink.

Micro-tubular SOFC fabrication procedures.—The NiO-SDC composite micro-tubular anode substrate precursors were prepared, followed by the fabrication of NiO-SDC/SDC/PBCO cells. Specifically PVP and PESf were dissolved in NMP to form an organic solution as described above. NiO-SDC mixed powders prepared above were added into the solution, which was stirred for 48 h to form a homogeneous spinning slurry. Graphite slurry was prepared using the same procedure. The compositions of the slurries are provided in Table 3, see FIG. 16. The graphite slurry was prepared with one composition, while three NiO-SDC slurries with different compositions were prepared for the purpose of comparison. Prior to extrusion, these slurries were degassed for 10 min to remove trapped air bubbles.

Figure 17:
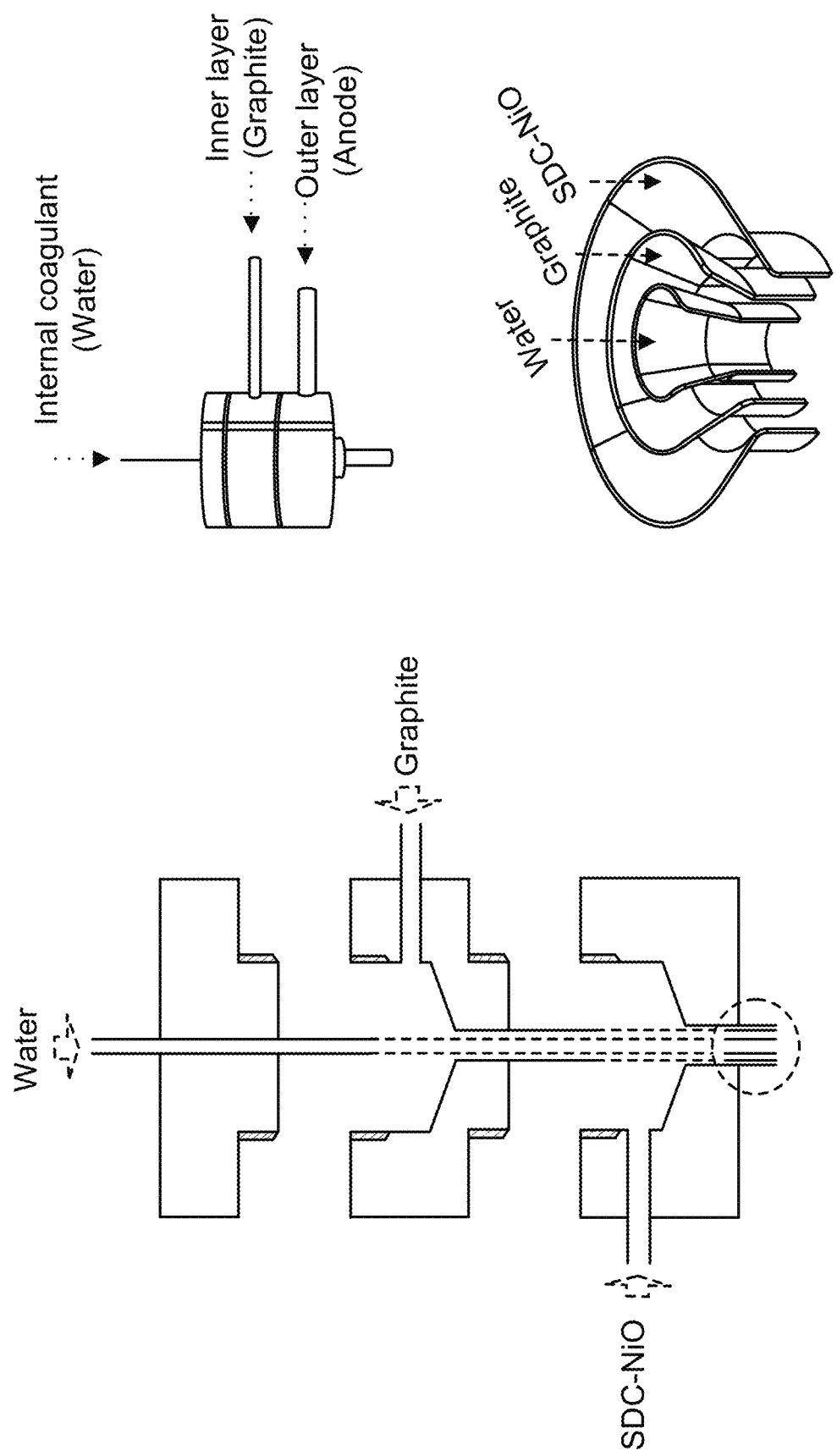
FIG. 17 shows a working principle and design illustration of triple orifice spinneret mold.
Figure 18:
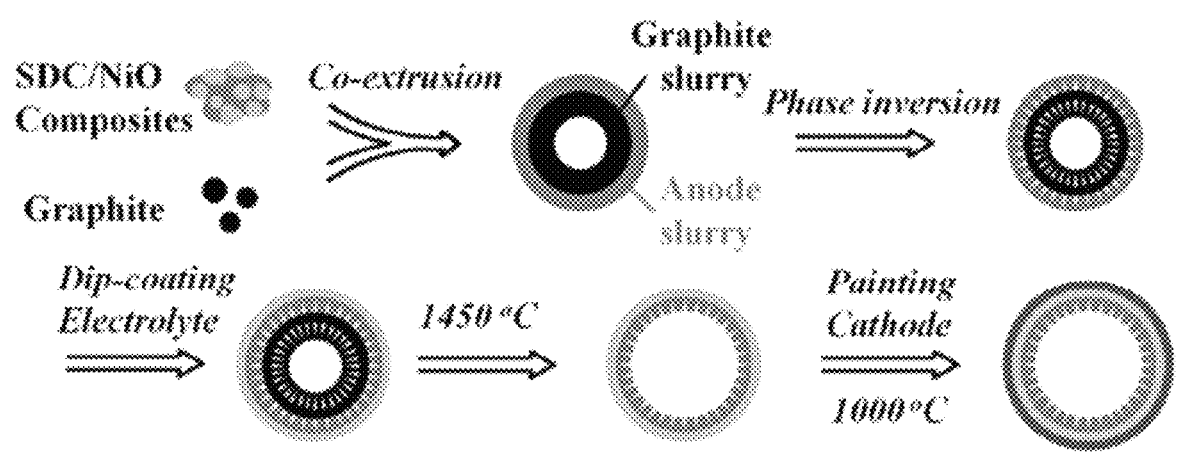
FIG. 18 shows a schematic illustration of MT-SOFC fabrication process.

The micro-tubular precursors were prepared by a phase inversion based dual-layer co-extrusion process using a stainless steel mold. The design and working principle of the mold are schematically shown in FIG. 17. A schematic illustration of the cell preparation process is shown in FIG. 18. The spinning NiO-SDC and graphite slurries were loaded into the outer and inner chambers of the stainless steel mold respectively. Tap water was used as the internal coagulant through the central channel of the mold. NiO-SDC slurry and graphite slurry as well as internal coagulant were drawn simultaneously through a triple orifice spinneret at the bottom of the mold.

Figure 20:
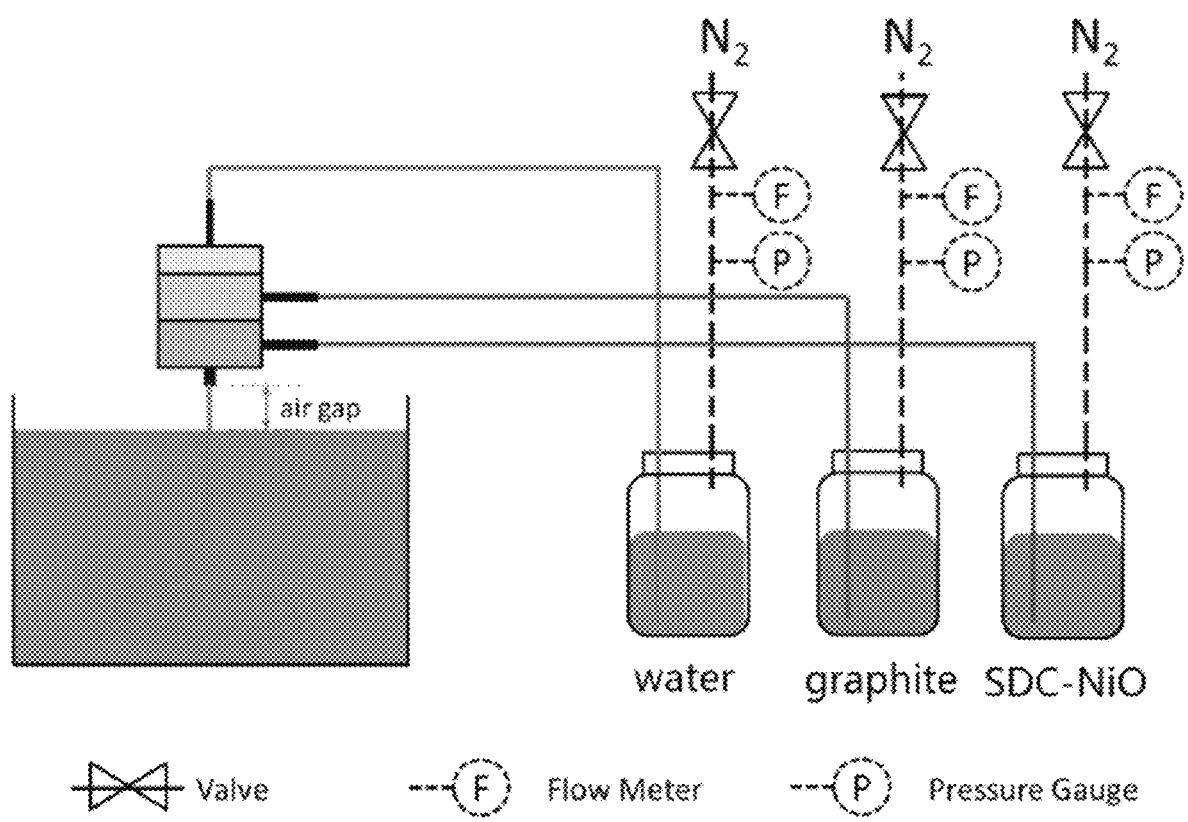
FIG. 20 shows a schematic illustration of co-extrusion system for the fabrication of dual-layer micro-tubular anode substrate.

The flow rates of the slurries and internal coagulant were controlled by flow meters (Seven Star, China) in combination with an in-house built pressurized nitrogen gas system, see FIG. 20. The distance between spinneret orifice and water bath, i.e., air gap, was controlled at 5 mm. Detailed extrusion parameters are listed in Table 4, see FIG. 19. Once the coextruded dual-layer slurries were immersed into the water bath, phase inversion process took place. At the early stage of phase-inversion process, the exchange between water (non-solvent) and NMP (solvent) led to the formation of finger-like pores. This exchange process is relatively fast. In the meantime, solidification process occurred due to the decrease of solvent (NMP) concentration in the slurry. This process was assumed to be relatively slow and mainly occurred at the later stage of phase-inversion process. The extruded micro-tubular green bodies were left in water bath for 24 h, allowing for the completion of the solidification process. The micro-tubular green bodies were then cut and dried at room temperature prior to application of the electrolyte layer.

The composition of SDC electrolyte solution is shown in Table 5, see FIG. 21. The SDC solution was mixed and ball-milled for 7 days before use. Dual-layer anode substrate precursor was sealed at both ends using PTFE films. The sealed substrate precursor was immersed into the SDC solution for 5 minutes and then dried up in air at room temperature. Such a coating procedure was repeated for 10 times. The assembly of dual-layer anode substrate precursor coated with SDC electrolyte were then co-sintered at 1450° C. for 5 h with a heating and cooling rate of 3° C./min to form a thin film dense electrolyte and a half-cell. Cathode ink was then brush-painted onto the SDC electrolyte thin film, followed by firing at 1000° C. for 3 h to form a single cell. The active cathode area was ~0.23 cm$^2$.

For comparison, the phase inversion based single layer extrusion method (without a graphite layer) was employed to prepare an anode substrate, followed by clip-coating electrolyte and painting cathode with the same processes as described above.

Figure 22:
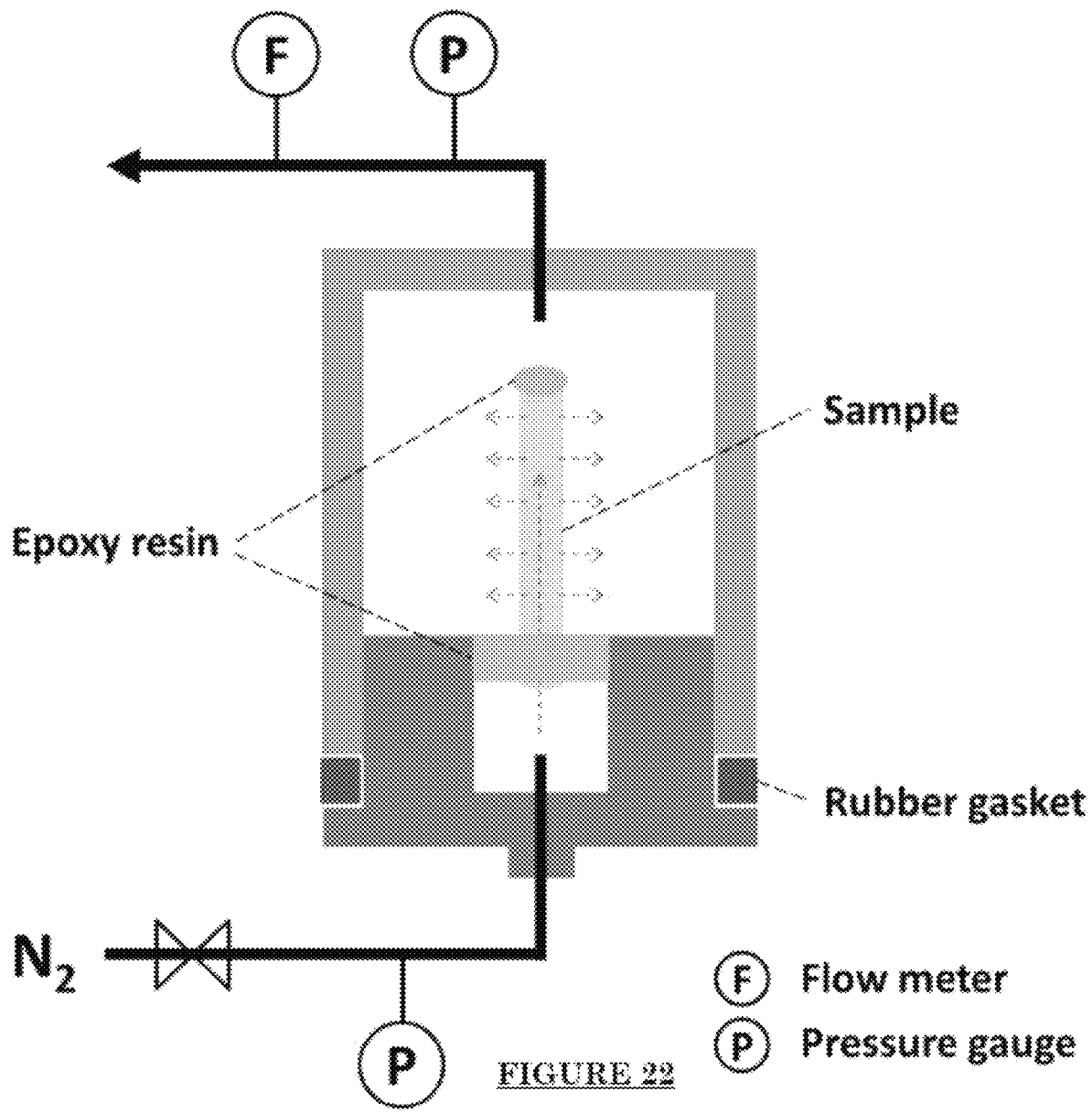
FIG. 22 shows a schematic illustration of the experimental setup for gas permeation measurement.

For gas permeation characterization (see schematic illustration of the experimental setup in FIG. 22), the NiO-SDC micro-tubular green anode substrates were sintered at 1450° C. for 5 h in air, some of the sintered anode substrates were also heated up to 600° C. with a heating rate of 2° C./min in nitrogen and then reduced at this temperature for 5 h in humidified H$_2$.

In what follows, the cells fabricated with the dual-layer coextrusion method are referred to as novel cells, those fabricated with single layer extrusion method are denoted as conventional cells.

Characterizations and electrochemical measurements. The microstructure of the prepared micro-tubular precursors and single cells were characterized using scanning electron microscopy (SEM, Zeiss Ultra Plus FESEM, Germany). The gas permeability of the Ni-SDC anode substrate was measured using an in-house built system, see FIG. 22. Specifically, the sample was sealed at one end by epoxy resin and supported at the other end by a connector with epoxy resin, enclosed by a stainless steel cylinder at the symmetrical central line. As a result, a chamber was formed between the sample and the cylinder. Nitrogen gas was fed into the sample of the micro-tubular substrate at various transmembrane pressures. The flux of the permeated nitrogen through the sample into the chamber was measured using a soap bubble flowmeter. The permeation measurements were carried out for both the unreduced anode substrate and the reduced one.

Figure 23:
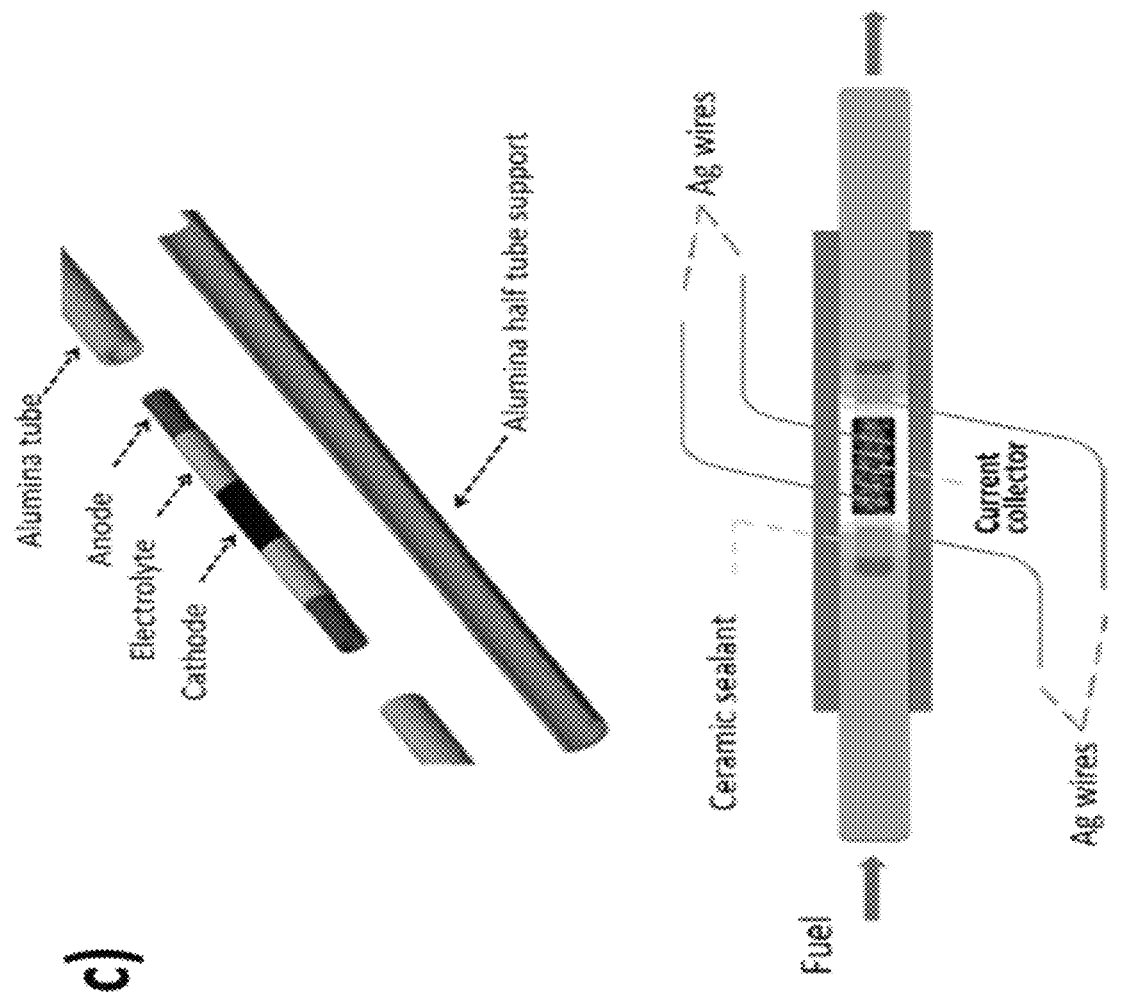
FIG. 23 shows at: a) SDC-NiO/Graphite precursors, b) fabricated single cells; and c) schematic illustration of test stand setup for electro-chemical measurement of MT-SOFCs.

For the electrochemical measurements, the fabricated single cells, schematically shown in FIG. 23, were tested from 500 to 600° C. with humidified hydrogen as fuel and the static air as oxidant. Silver paste was painted onto the cathode as a current collector. Silver wire was wound around the cathode and at either end of the anode substrate to serve as the current collector. Ceramic paste (Aremco Products, Inc. USA) was used to seal and attach either end of the anode substrate onto the test stand. The temperature of the cell was controlled using a tube furnace (MTI, USA). The flow rate of fuel was controlled at 10, 20 and 30 mL min$^{-1}$ respectively using a precision flowmeter (APEX). Nitrogen gas was first supplied to the anode of the cell at room temperature. The cell was then heated up from room temperature to 600° C. at the rate of 2. C per minute. Once the temperature of the cell reached 600° C., the gas supplied to the anode was switched from nitrogen to humidified hydrogen. The anode reduction under this condition was last for 5 h before electrochemical testing. The voltage-current (V-I) and electrochemical impedance spectra (EIS) were measured using a Solartron 1260/1287 electrochemical workstation. The EIS measurements were performed with a voltage perturbation of 10 mV over the frequency range from 0.01 Hz to 105 Hz, under open circuit voltage conditions and different working voltages.

Results and Discussion

Microstructures of the co-extruded micro-tubular anode substrates. With the fabrication process described above, a microtube with a dual-layer structure of NiO-SDC/graphite was formed. The subsequent exchange process of water and NMP molecules formed multi-layered microstructures within the dual-layer micro-tube in the following order: outer surface skin layer/finger-like layer/sponge-like layer/finger-like layer/inner surface skin layer, see FIG. 24 at a1 and a2.

Since the compositions of slurries affected the rate of the exchange process between water and NMP molecules, it is suspected that they play important roles on determining the relative locations of multilayer interfaces. To examine this further, three MT substrate samples were prepared using three differently loaded compositions of NiO-SDC slurries, see Table 3, FIG. 16. The cross-sectional views of the green bodies were shown in FIG. 24 at a1, a2, b1, b2, c1, and c2, respectively. When the solid content of NiO-SDC was relatively high, e.g., 80 wt %, the rate of solvent/water exchange from the tube outer surface was relatively low, the sponge-like layer was confined within the NiO-SDC layer, see FIG. 24 at a2. When the solid content of NiO-SDC was reduced to 75 wt %, the solvent/water exchange rate was improved, pushing the sponge-like layer to the NiO-SDC/graphite interface, see FIG. 24 at b2. When the solid content of NiO-SDC was further reduced to 70 wt %, the sponge-like layer was further pushed into the graphite layer, see FIG. 24 at c2.

Figure 24:
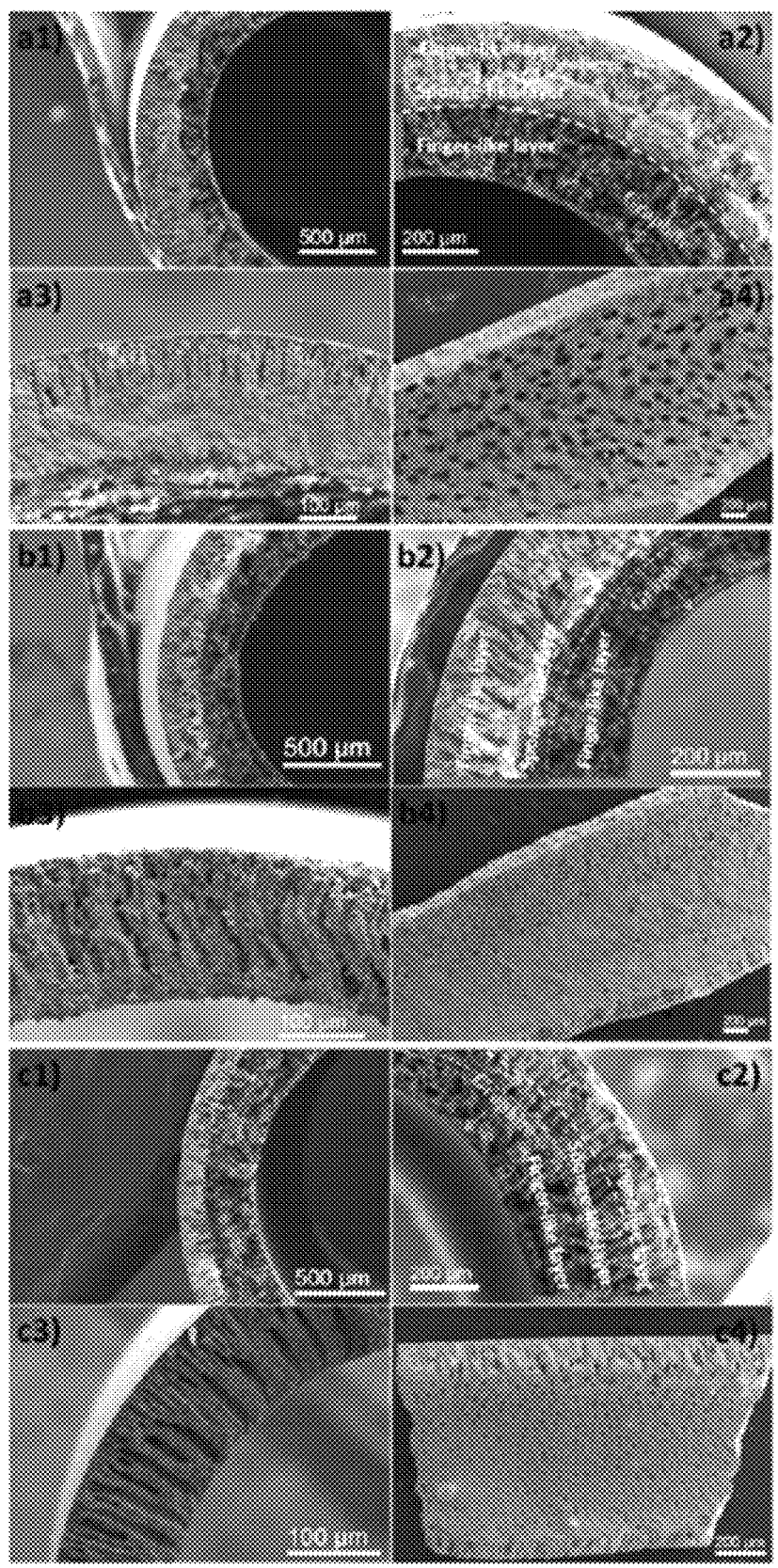
FIG. 24 shows SEM images of the NiO-SDC/Graphite dual-layer micro-tubes prepared with different slurry compositions at: (a) solid content 80 wt. %; (b) 75 wt. % and (c) 70 wt. %. (a1-c1) cross-sections of micro-tubular precursors; (a2-c2) partial enlarged details of a1-c1; (a3-c3) cross-sections of micro-tubes after sintered at 1450° C. for 5 h; (a4-c4) inner surfaces of the sintered micro-tubes.

The graphite layer served as a sacrificial layer. After firing the micro-tubular green body, the graphite layer was burnt out, leaving a NiO-SDC layer. It was observed that the relative location of the sponge-like layer was very critical in determining microstructures of resultant NiO-SDC substrate. In particular, for the substrate in FIG. 24 at a1 and a2, after firing, the graphite layer was removed, see FIG. 24 at a3, creating open pores at the internal surface of NiO-SDC micro-tube, see FIG. 24 at a4. Unfortunately, the sponge-like layer was still in the NiO-SDC layer, blocking the finger-like micro-channels in NiO-SDC substrate, see FIG. 24 at a3. In the case of FIG. 24 at b1-b2, because the sponge-like layer was at the NiO-SDC/graphite interface, after removing the graphite layer, see FIG. 24 at b3, the finger-like micro-channels in NiO-SDC layer were still partially blocked by the inner surface of NiO-SDC microtube. This can be seen from FIG. 24 at b4. In the case of FIG. 24 at c1-c2, after the graphite layer was eliminated through firing, the sponge-like layer in the graphite layer was completely eliminated, see FIG. 24 at c3, leaving the open pores on the inner surface, see FIG. 24 at c4, and forming a unique microchannel array well aligned radically in the NiO-SDC micro-tubular substrate. It is expected that this micro-tubular substrate with more open microstructure will significantly improve fuel/gas diffusion and electrochemical performance of the cell.

Figure 25:
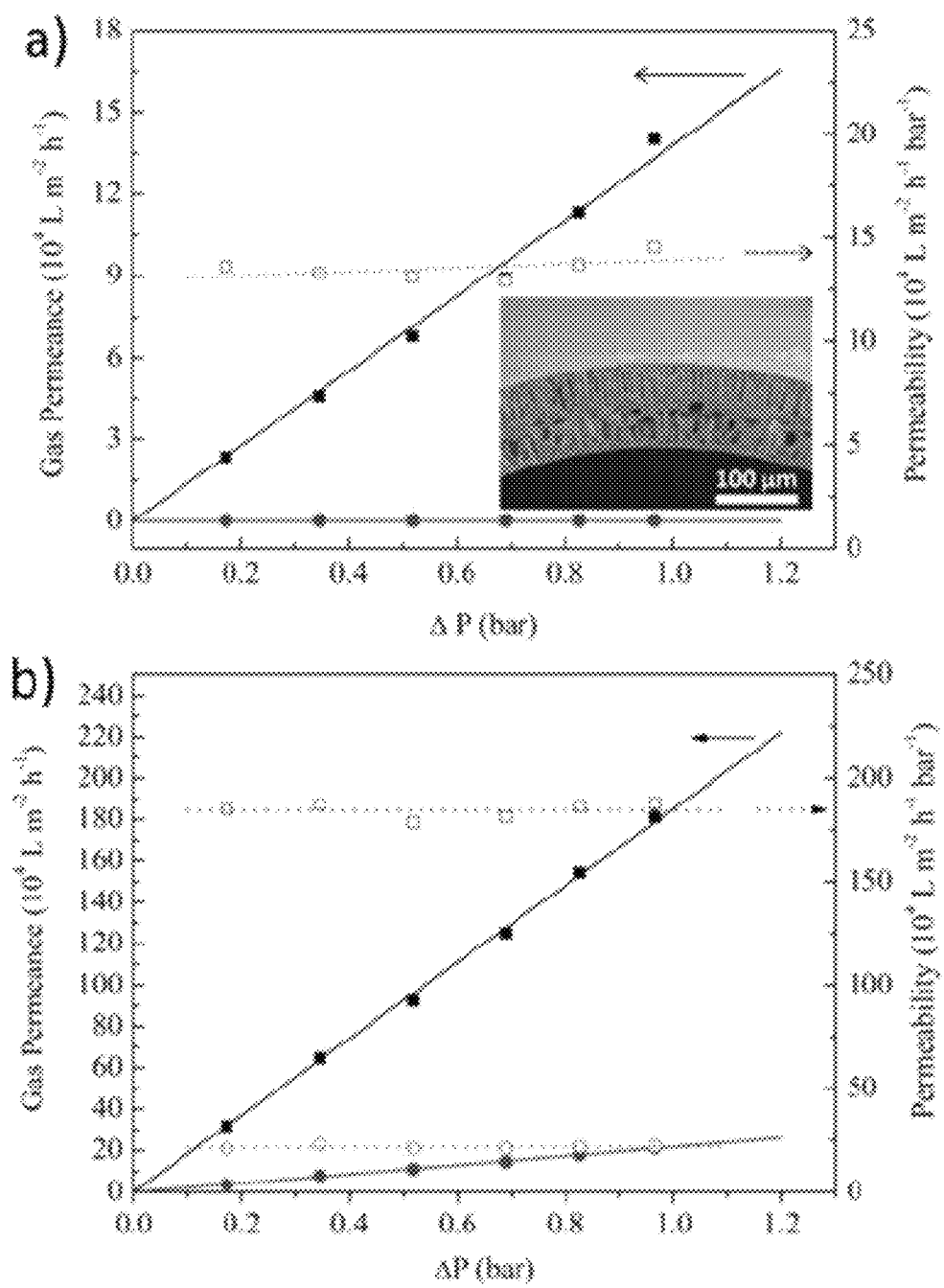
FIG. 25 shows gas permeability of: (a) the NiO-SDC micro-tubes sintered at 1450° C. for 5 h; and (b) the sintered Ni-SDC micro-tubular substrate reduced at 600° C. for 5 h.

Gas permeability of the microtubular substrate. To determine gas permeability of the fabricated micro-tubular substrate, the NiO-SDC micro-tubular precursors were first sintered at 1450° C. for 5 h in air and then reduced at 600° C. for 5 h in humidified $H_2$. The gas permeability of the sintered NiO-SDC micro-tubular substrates was measured before and after reducing treatment. As a comparison, NiO-SDC micro-tubular precursors were also prepared using well demonstrated phase inversion based single layer extrusion method, where the sponge-like layer was sandwiched by finger-like layers on either side, see FIG. 25 at a. The conventional micro-tubular precursors were sintered and reduced under the same conditions as those of the novel micro-tubular precursors. The gas permeability testing results are shown in FIG. 25. The sintered dual-layer co-extruded micro-tubular substrate before reducing treatment shows the permeability of ~13.5×10$^4$ L m$^{-2}$ h$^{-1}$ bar$^{-1}$, see FIG. 25 at a. It is not surprising to see that the permeability of the sintered conventional micro-tubular substrate is almost zero, indicating that the middle sponge-like layer was almost gastight after sintering, see FIG. 25 at a. After a reducing treatment at 600° C. for 5 h in humidified $H_2$, the gas permeability of both coextruded and single layer extruded NiO-SDC micro-tubular substrates were improved due to the fact that the NiO was reduced to Ni, leading to increased porosity. In particular, the permeability of conventional micro-tubular substrate was ~20×10$^4$ L m$^{-2}$ h$^{-1}$ bar$^{-1}$. Interestingly, the permeability of the novel micro-tubular substrate increased to ~180×10$^4$ Lm$^{-2}$ h$^{-1}$ bar$^{-1}$, 9 times that measured for the conventional one, see FIG. 25 at b. As will be shown later on, the high permeability of NiO-SDC micro-tubular substrate is able to significantly improve the electrochemical performance of the corresponding cells.

Figure 26:
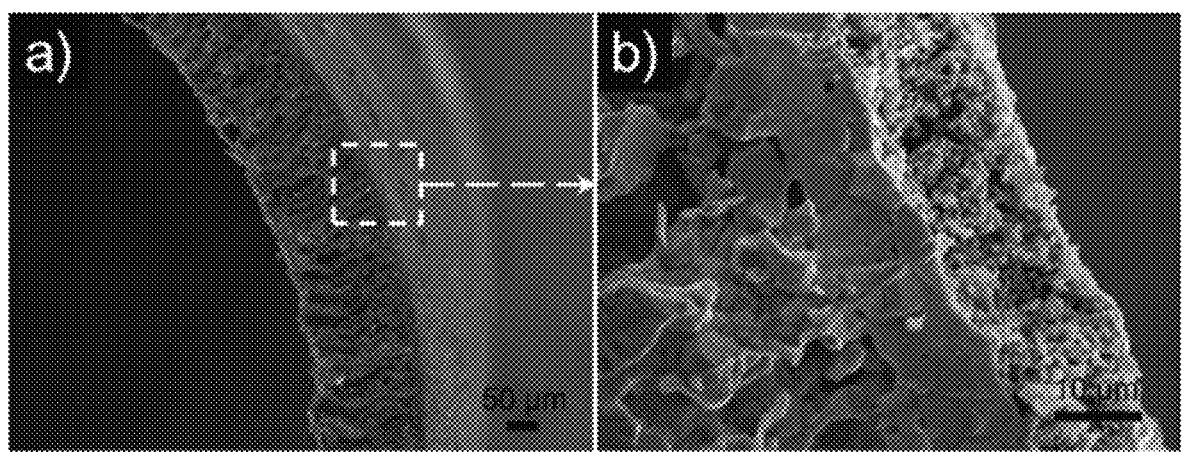
FIG. 26 shows microstructure of the NiO-SDC/SDC/PBCO MT-SOFC at: (a) cross-section; and (b) partially enlarged image near the electrode/electrolyte interface.

Microstructure of the anode-supported MT-SOFC. Microtubular SOFCs were fabricated based on the extruded dual-layer anode precursor, where a 70 wt % solid content of anode slurry was employed. FIG. 26 at a shows the cross-sectional image of a single cell. The enlarged image near the anode/electrolyte interface is shown in FIG. 26 at b. The SDC electrolyte was dense with the thickness of about 10 μm and showed intimate contact with the anode substrate. The PBCO cathode had uniform thickness of about 12 μm and also appeared to have intimate contact with the electrolyte layer.

Figure 27:
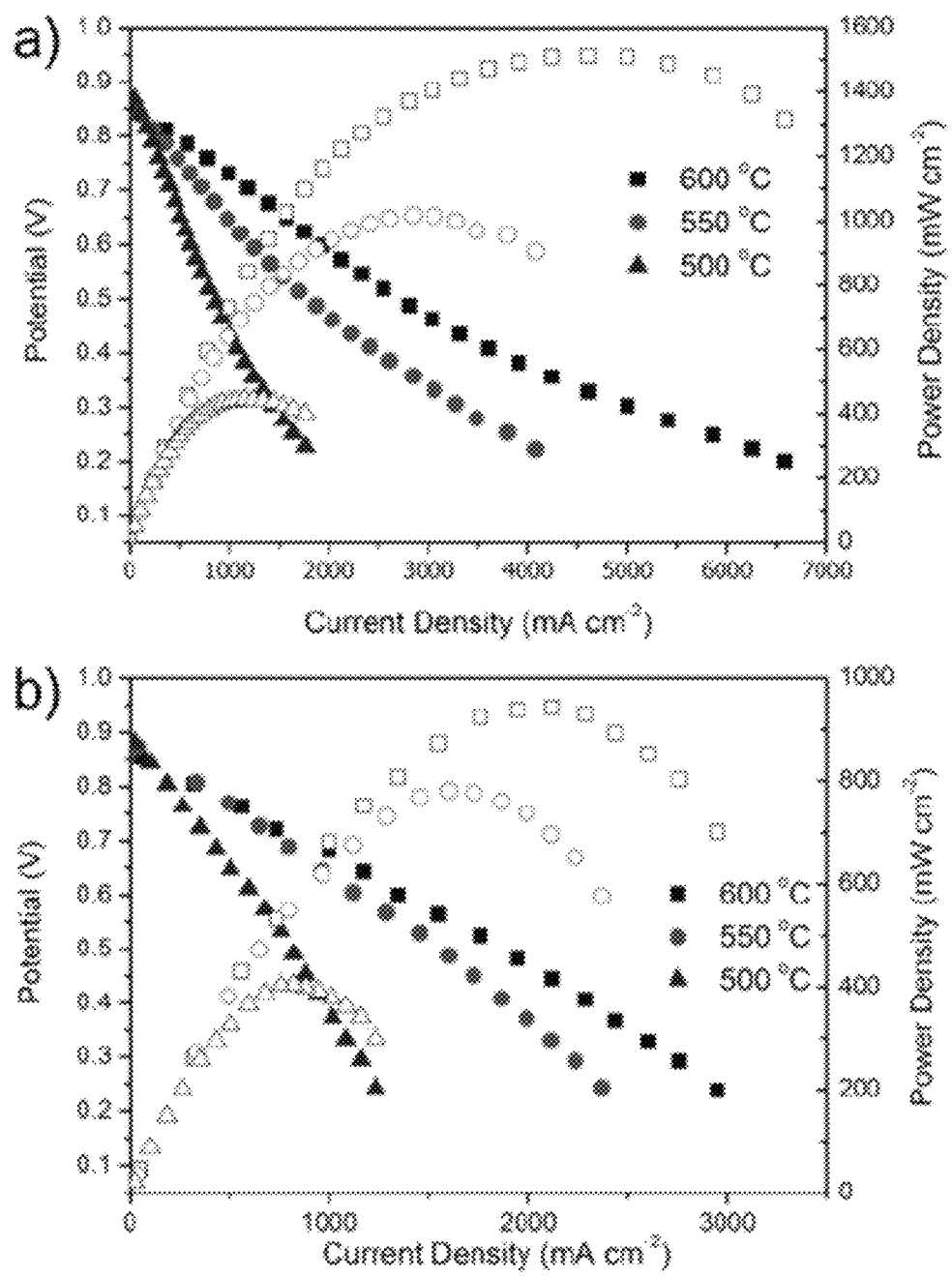
FIG. 27 shows electrochemical performance of MT-SOFCs at different temperatures at: a) prepared through the co-extrusion method in this study; and b) prepared through the single layer extrusion method.

Electrochemical performance of the MT-SOFCs. The electrochemical performance of the fabricated MT-SOFCs was tested at 500, 550, and 600° C., respectively. The humidified $H_2$ was used as the fuel and static air as the oxidant. The flow rate of $H_2$ supply was controlled at 30 mL/min. FIG. 27 at a shows the I-P & I-V curves of the cell. The open circuit voltage (OCV) reached about 0.89 V-0.85 V at 500° C.-600° C., which were comparable to those of the planar cells with SDC electrolyte, see, L. Zhao, B. B. He, J. C. Shen, F. L. Chen, and C. Xia, *Electrochemistry Communications*, 13, 450 (2011) and W. Yang, T. Hong, S. Li, Z. H. Ma, C. W. Sun, C. R. Xia, and L. Q. Chen, *Acs Appl Mater Inter*, 5, 1143 (2013), but much higher than those of MT-SOFCs with thin SDC electrolyte in open literature. See, J. Xiao, Z. T. Tao, Z. W. Zhu, W. Liu, and W. P. Sun, Int J Appl Ceram Tec, 9, 1064 (2012) and M. Morales, M. A. Laguna-Bercero, M. E. Navarro, F. Espiell, and M. Segarra, Rsc Adv, 5, 39350 (2015).

The OCV of the cell slightly decreased with increasing operating temperatures. An ideal electrolyte should be a pure ionic conductor. However, SDC is known to exhibit mixed electronic-ionic conductivity and a slight electronic current may exist through the SDC electrolyte in short-circuit pathways, leading to current leakage and decreased OCVs. Increasing temperatures facilitates the current leakage of SDC electrolyte and may have caused the increased OCV drop. The V-I curves showed decreasing slopes in the range of relatively high current densities, indicating that concentration polarization loss induced by fuel/gas diffusion resistance was not dominant. See, J. W. Kim, A. V. Virkar, K. Z. Fung, K. Mehta, and S. C. Singhal, *J Electrochem Soc*, 146, 69 (1999), L. Chen, M. Yao, and C. Xia, *Electrochemistry Communications*, 38, 114 (2014), and H. Huang, J. Lin, Y. Wang, S. Wang, C. Xia, and C. Chen, *J Power Sources*, 1114 (2015).

The cell demonstrated peak power densities of 1484 mW cm−2, 1036 mW cm−2 and 439 mW cm−2 at 600, 550 and 500° C., respectively. By contrast, the peak power densities of MT-SOFC prepared using the conventional phase-inversion method were 954 mW cm−2, 782 mW cm−2 and 392 mW cm−2 at 600, 550 and 500° C., respectively, see FIG. 27 at b, significantly lower than those of the novel cell. Since the conventional MT-SOFC is the same as the novel cell in material system and fabrication processes except for the preparation of the anode substrate, it is reasonable to assume that the microstructure of the anode substrates led to the difference in electrochemical performance. Since the gas permeability measurements, described in the previous section, indicate the co-extruded anode substrate is ~9 times that of single layer extruded anode substrate, the more open porous microstructure of the anode substrate likely contributes to the improved performance of the novel cell over the conventional one. In fact, the V-I curves of the conventional cell showed a slight bending-down in the range of high current densities, see FIG. 27 at b. This observation indicates that the fuel/gas diffusion process could be a potential limiting factor, leading to further evidence that the performance difference may be due to the differences in microstructure.

Figure 28:
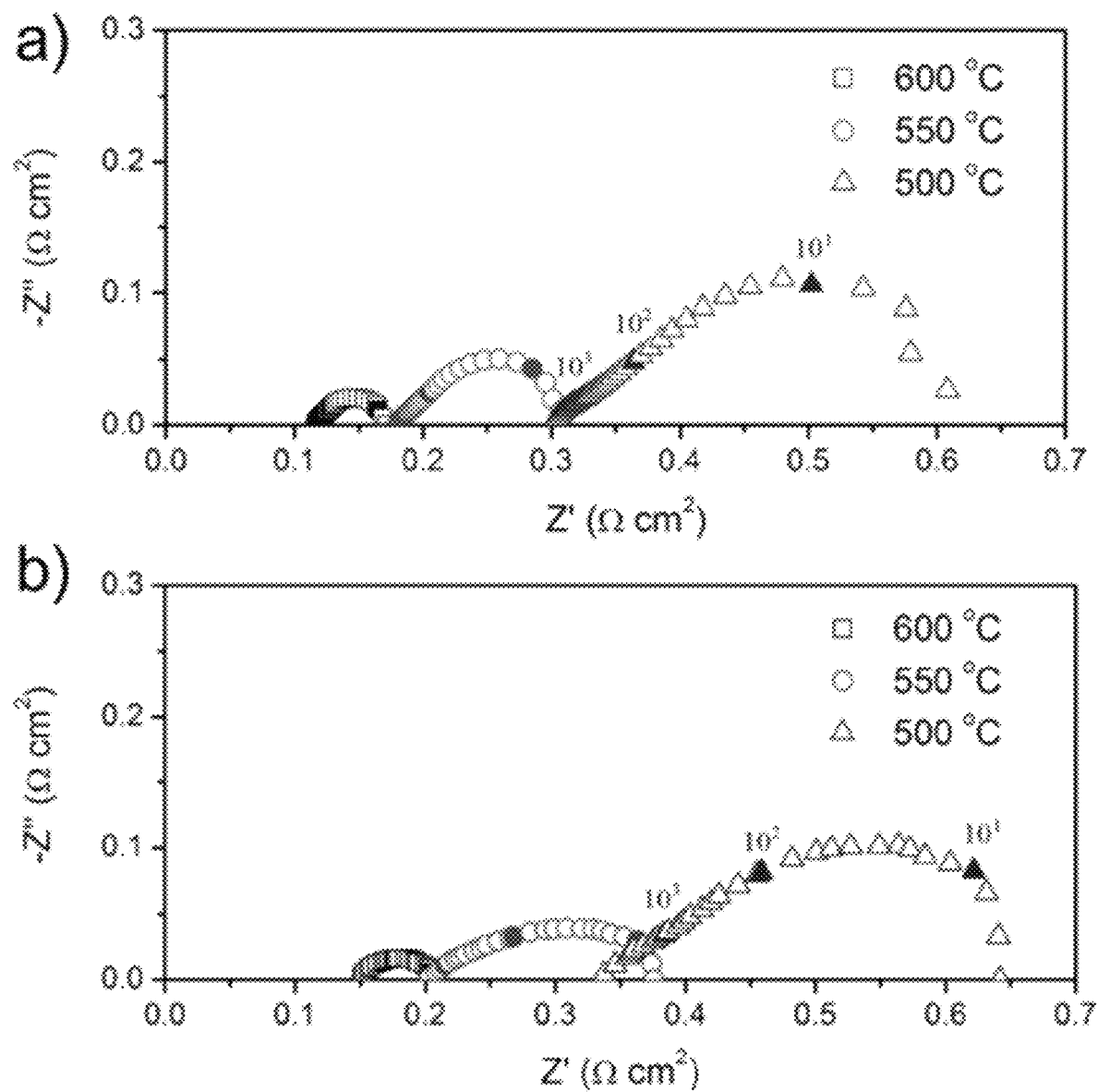
FIG. 28 shows impedance spectra under OCV conditions at different temperatures at: a) novel cell; and b) conventional cell.

FIG. 28 displays electrochemical impedance spectra (EIS) of the cell measured under open circuit voltage conditions. As shown in FIG. 28 at a, the cell total resistance (Rt) decreased from 0.61 to 0.17 cm$^2$ and overall polarization resistance (Rp) from 0.29 to 0.05 cm$^2$ with increasing the temperature from 500 to 600° C. Both ohmic resistance (Ro) and overall polarization resistance of conventional cell were a little higher than those of novel cell especially at the temperature of 500° C., see FIG. 28 at b, these also led to the improved power densities of the novel cell. To further highlight the advantages of the novel cell, Table 6, see FIG. 29, summarizes the performance comparisons of our cells and anode-supported NiO-SDC/SDC/PBCO SOFCs in the open literature. See, D. J. Chen, R. Ran, and Z. P. Shao, *J Power Sources*, 195, 7187 (2010), Y. Wang, H. Zhang, F. L. Chen, and C. R. Xia, *J Power Sources*, 203, 34 (2012), and D. J. Chen, R. Ran, K. Zhang, J. Wang, and Z. P. Shao, *J Power Sources*, 188, 96 (2009). The Rp value 0.05 cm2 at 600° C. of our cell is on the lower range of the values reported in literature. The peak power density of our cell is much higher than those of other cells in literature.

Since the fuel/gas diffusion in the anode substrate significantly affects electrochemical performance of MT-SOFCs, it is believed that the inlet fuel flow rate will also have significant effects on cell performance. Here, three inlet fuel flow rates of 10 mL min$^{-1}$, 20 mL min$^{-1}$ and 30 mL min$^{-1}$, were supplied to the anode of the cell at 600° C. respectively, the corresponding cell performance was shown in FIG. 30.

Obviously the electrochemical performance of the cell was improved when the anode inlet flow rate was increased from 10 to 30 mL min$^{-1}$. However, the behavior of novel cell is different from that of conventional cell at different inlet fuel flow rates. Specifically, at relatively low inlet fuel flow rate of 10 mL min$^{-1}$, the V-I curve of novel cell was a straight line, but that of conventional cell was depressed at relatively high current densities, indicating the performance of the conventional cell at high current density was limited by concentration polarization loss. One also can notice that the V-I curve of the conventional cell was lower than that of the novel cell at high current densities, which is likely due to the anode diffusion limitations. When the inlet fuel flow rate was increased to 20 mL min$^{-1}$, the V-I curve of novel cell became a concaved line with a slight upward at high current densities while that of conventional cell was still lower. This observation indicates that the concentration polarization loss induced by fuel diffusion in the anode electrode limited the performance of conventional cells. This result further highlighted the significance of microchannel array in anode substrate for facile fuel diffusion resulting in improved cell performance. When the inlet fuel flow rate was further increased to 30 mL min$^{-1}$, the cell behavior was quite similar to those at the fuel flow rate of 20 mL min$^{-1}$. Particularly, the V-I curve of the novel cell shows a lower voltage decline, see FIG. 30 at a, compared to the conventional cell, see FIG. 30 at b, at high current densities. These results indicate that the novel cell has smaller limitations for fuel/gas diffusion and can be operated at relatively low fuel feeding rates. In fact, the novel cell at the fuel flow rate of 10 ml/min reached the peak power density of ~920 mWcm$^{-2}$, which is close to that of conventional cell, e.g., ~950 mWcm$^{-2}$, at the fuel flow rate of 30 ml/min. This observation further implies that the novel cell may obtain higher efficiencies of both fuel utilization and energy conversion than conventional cell.

Figure 30:
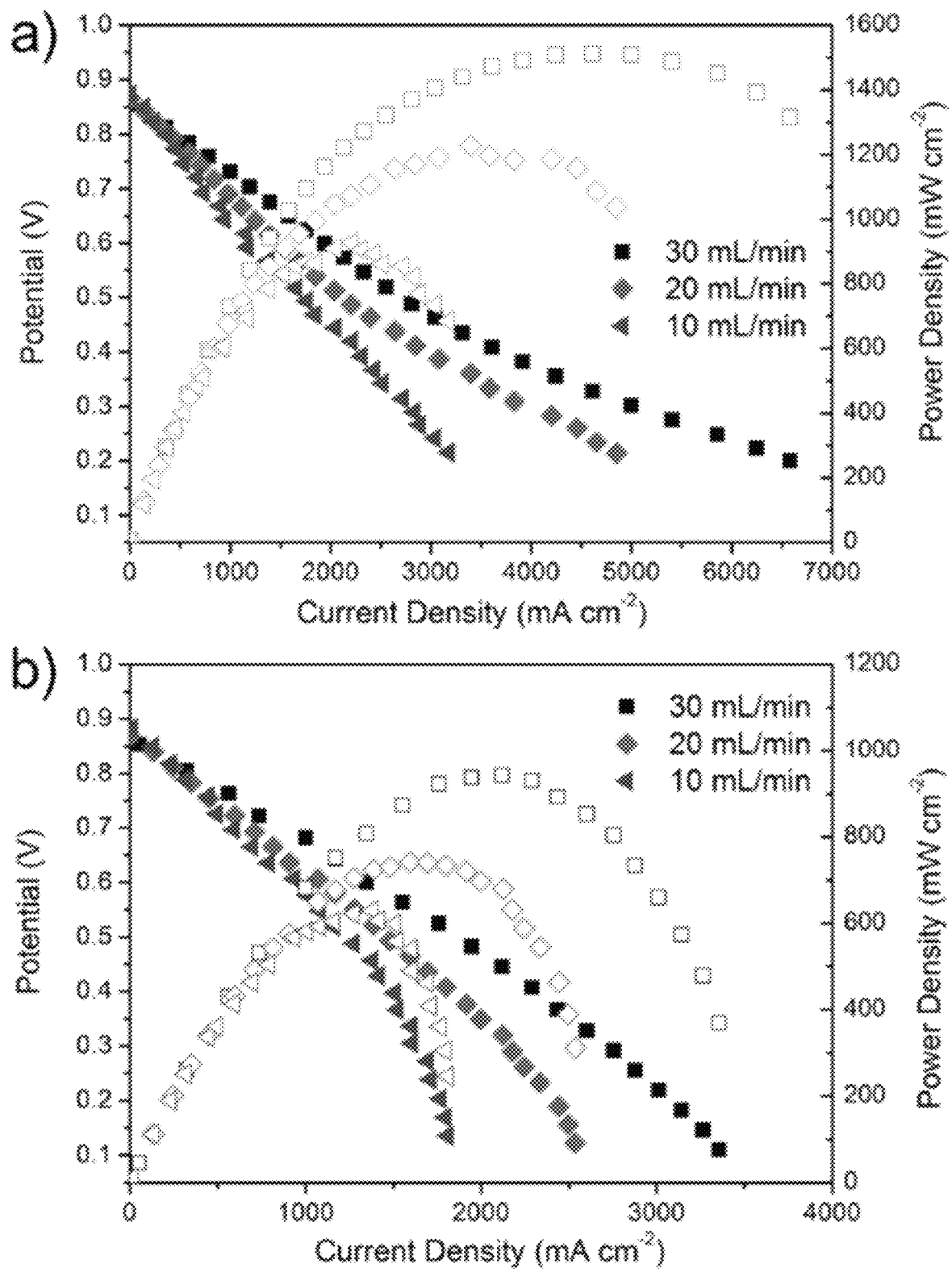
FIG. 30 shows Electrochemical performance of MT-SOFCs at different fuel feeding rates at: a) novel cell; and b) conventional cell.
Figure 31:
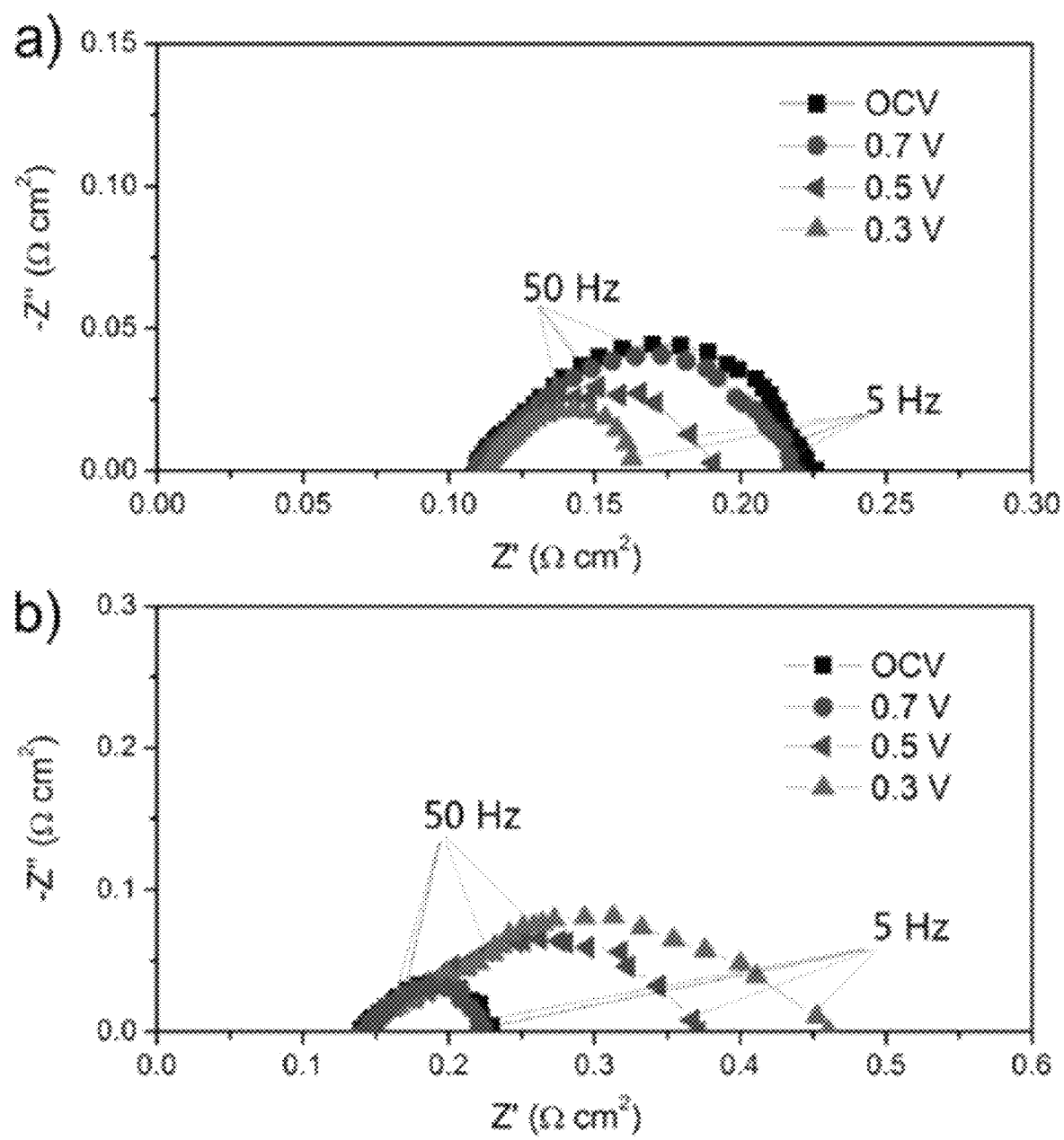
FIG. 31 shows impedance spectra under different voltages at 600° C. with fixed fuel flux of 20 mL min$^{-1}$: a) novel cell; b) conventional cell.

FIG. 31 displays electrochemical impedance spectra (EIS) of the cell measured at different operating voltages under the fuel flow rate of 20 mL min$^{-1}$. As shown in FIG. 31 at a, the polarization resistance (Rp) of the novel cell decreased from 0.11 to 0.06 cm$^2$ with decreasing the cell operating voltages from OCV to 0.3 V. As shown in FIG. 30 at a, the V-I curve under the flow rate of 20 mL min$^{-1}$ was a concaved line and showed a slight upward. Accordingly, the slope of the V-I curve decreased with decreasing cell operating voltages. These results are consistent with above EIS results. By contrast, the overall polarization resistance of conventional cell increased from 0.10 to 0.31 cm$^2$ with decreasing the cell operating voltages, see FIG. 31 at b. Since the V-I curve of the conventional cell is a convex line, see FIG. 30 at b, where the curve was depressed down at low operating voltages, the slope of the V-I curve increased with decreasing the cell operating voltages, which are also consistent with EIS results. It is worth noting that both of the two SOFCs are anode-supported designs, where the cathode electrodes were of nearly the same thickness and fabricated using the same technique. For this reason, the majority of the difference of the overall polarization resistances under large current density is believed to be from the contributions of the anode. Since both cells in this study used Ni-SDC as the anode material, the microstructure difference of anode substrate is the likely contributor to the difference in polarization resistance, implying that the open micro-channel array structured anode significantly reduces the polarization resistance of the MT-SOFC. It has been recognized that the characteristic frequency range from 5 to 50 Hz in the EIS of an SOFC is related to the finite diffusion limitation. See, S. Primdahl and M. Mogensen, *J Electrochem Soc*, 145, 2431 (1998) and S. Primdahl and M. Mogensen, *J Electrochem Soc*, 146, 2827 (1999).

As shown in FIG. 31 at a, the EIS arcs in this frequency range were significantly decreased when the co-extruded cell was used, further indicating that the difference of the overall polarization resistance of the MT-SOFC, to a large extent, was contributed by the improved gas diffusion capability of the anode with micro-channel array. In other words, it might be difficult to fundamentally overcome the fuel diffusion limitations in the conventional anode substrate by simply increasing inlet fuel flow rate, or equivalently fuel partial pressure, in the anode electrode. Microstructure optimization of electrodes is a primary method to lower concentration polarization losses caused by fuel/gas diffusion limitations as demonstrated above.

Figure 32:
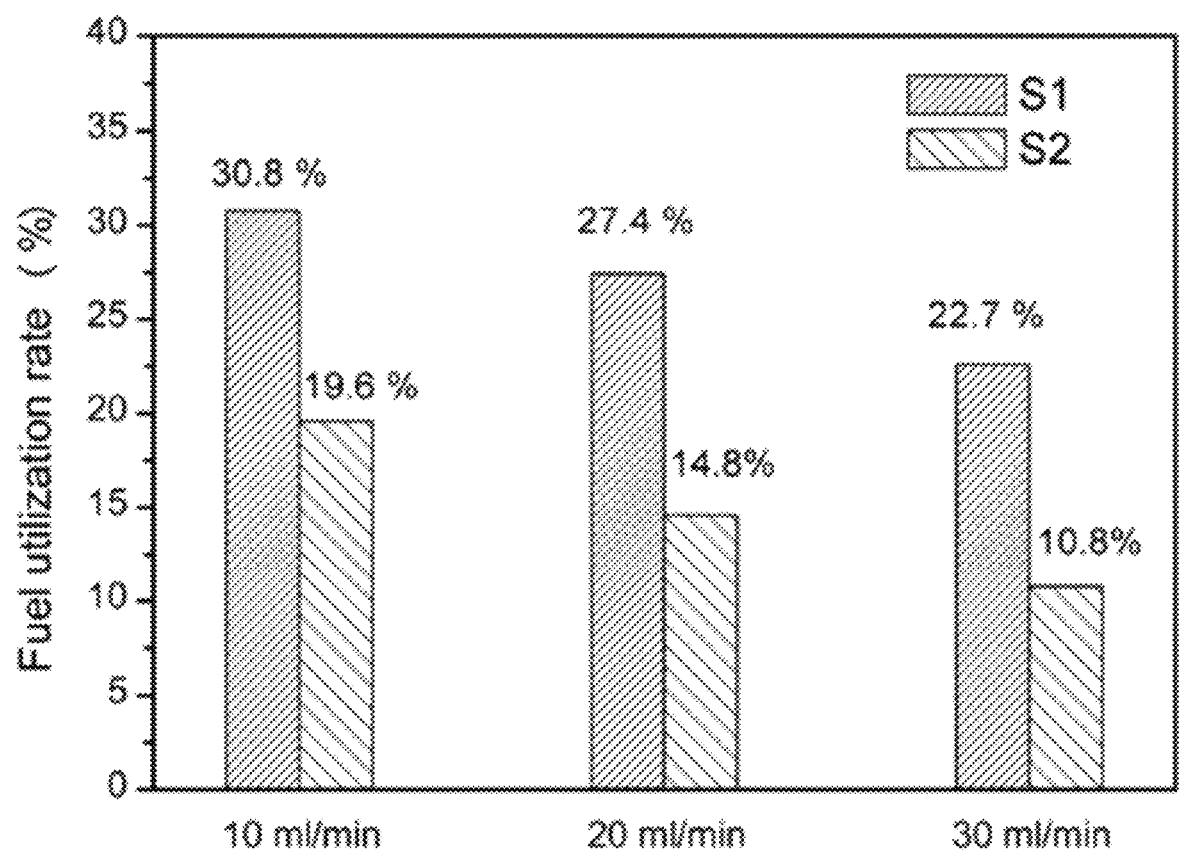
FIG. 32 shows fuel utilization rates of cells with different anode structures at different fuel feeding rates at 600° C.: S1: novel cell, without sponge-like layer; and S2: conventional cell, with sponge-like layer.

The micro-channel array embedded in the anode substrate significantly improved electrochemical performance of the cell. It is expected that it can also improve fuel utilization rate and therefore system efficiency. The fuel utilization rate was defined using the following equation:

(See, T. Li, Z. Wu, and K. Li, *J Power Sources*, 273, 999 (2015).)

$$U_f = \frac{I}{2F \times n_{H_2, inlet}} \times 100$$

where I denotes the electric current generated by the cell; F represents Faraday constant (A s mol$^{-1}$); $n_{H_2}$, inlet is the molar flow rate of hydrogen (mol s$^{-1}$). To simplify the analysis, the electrical current I at the maximum power density was chosen for the calculation of fuel utilization rate. As shown in FIG. 32, the fuel utilization rate of conventional cell was 19.6%, 14.8% and 10.8% at the inlet fuel flow rate of 10, 20, and 30 mL min$^{-1}$, respectively. However, that of the novel cell reached 30.8%, 27.4% and 22.7% respectively. Obviously the novel cell significantly improved the fuel utilization rate, especially at the high inlet fuel flow rate of 30 mL min$^{-1}$, where the fuel utilization rate was almost doubled compared to the conventional cell.

Figure 33:
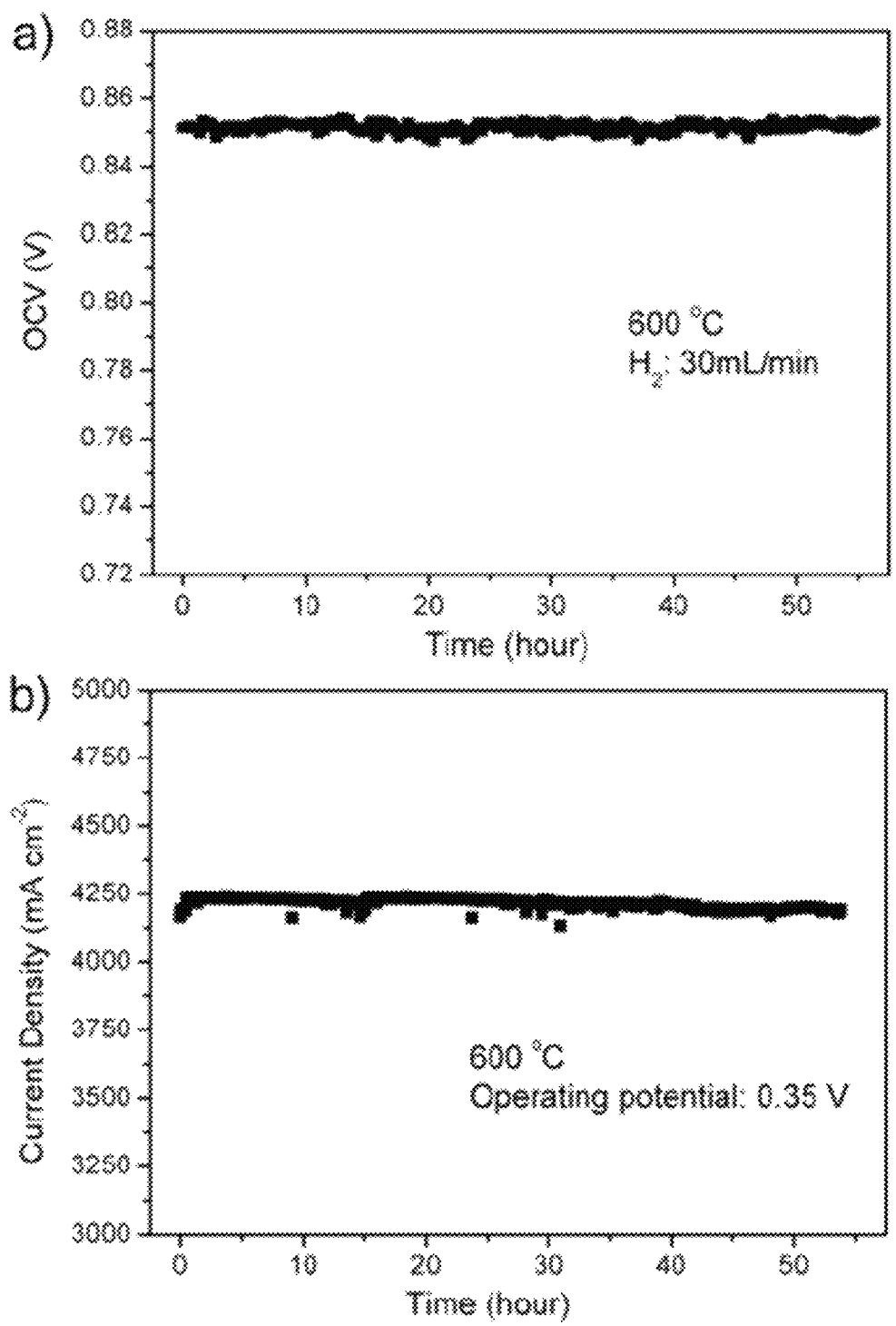
FIG. 33 shows short-term stability of the MT-SOFC prepared through coextrusion method, with fuel feeding rate of 30 mL min$^{-1}$ at 600° C. at: a) OCVs as a function of the elapsed time; and b) current density as a function of the operating time with output potential of 0.35 V (corresponding to maximum power density).
Figure 34:
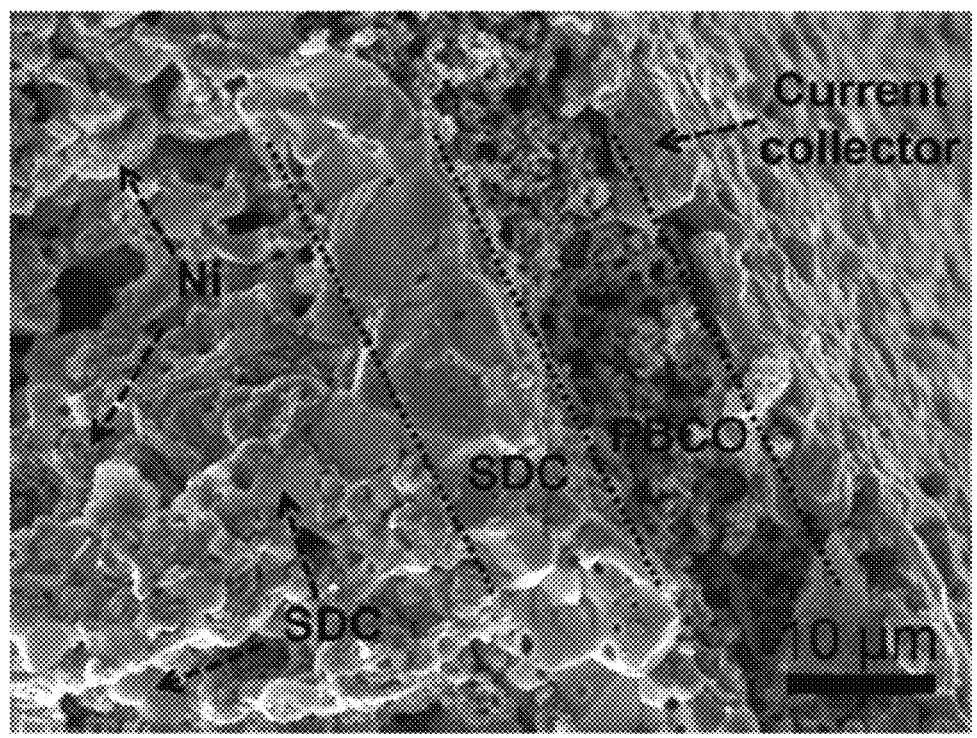
FIG. 34 shows a cross-sectional SEM image of the post-test MT-SOFC.

Durability is of particular importance for practical applications of SOFC technology. Here the short-term stability of the fabricated novel cell was demonstrated. The operating temperature of 600° C. and the inlet fuel flow rate of 30 mL min$^{-1}$ were used for the test. The short-term test was run for about 50 hours. The open circuit voltage of the cell was monitored as a function of the elapsed time. The results were recorded and shown in FIG. 33 at a. As one can see, the open circuit voltage was very stable, which can be attributed to the dense, crack-free, and stable structure of SDC electrolyte film. The short-term stability of the cell was also evaluated under external voltage loadings. Here, the loading voltage of 0.35 V was applied or equivalently the current density of ~4300 mA cm$^{-2}$ was generated, which corresponded to the maximum power density output of the cell. The short-term stability test under these conditions was shown in FIG. 33 at b. It can be seen that the current density was stable as well. While long-term durability of performance and associated degradation mechanisms are worth further study, but beyond the scope of this paper, the preliminary SEM characterization of the post-test cell indicated that the microstructure of the cell was stable. As shown in FIG. 34, a thin layer of silver current collector was observed on the cathode surface. The SDC electrolyte was dense with a few closed pores but without any cracks, and is intimately adhered to both the Ni-SDC anode substrate and PBCO cathode layer. The NiO phase was reduced to metallic nickel under the H$_2$ atmosphere and became porous. The micro-channels in Ni-SDC layer were still observable even though the cross section was enlarged locally. The cross-sectional image of post-test cell did not show obvious visible differences from that of the pre-test cell. These results indicated a very good structural stability of our MT-SOFC.

CONCLUSIONS

In summary, a phase inversion-based dual-layer co-extrusion approach was advanced to fabricate micro-channel array structured MT-SOFCs. The inner graphite layer was used as a sacrificial layer to eliminate the sponge-like and inner surface skin layers. As a result, the micro-channel array embedded in the outer NiO-SDC layer has a more open porous structure, and significantly improved fuel/gas diffusion in the anode substrate. The as-fabricated NiO-SDC anode substrate exhibited excellent gas permeation performance, 9 times that of the anode substrate fabricated with single layer extrusion method. The OCVs of the corresponding microtubular cell Ni-SDC/SDC/PrBaCo$_2$O$_{5+\delta}$ were 0.89 V-0.85 V at 500-600° C., much higher than those of other SDC electrolyte based MT-SOFCs in open literature. The peak power density of the cell was ~1484 mW cm$^{-2}$ at 600° C., approximately 1.5 times that of a similar cell with an anode substrate fabricated from the single layer extrusion method. This is the highest performance among the SOFCs with the same material system in open literature. The significantly improved fuel utilization rate with the novel cell was demonstrated over the conventional cell. The excellent short term stability was also demonstrated under both open circuit voltage and maximum power density output conditions.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A micro-tubular solid oxide fuel cell comprising:
a NiO-SDC anode substrate;
an internal graphite layer;
at least one micro channel forming a micro channel array extending through both the NiO-SDC anode and the internal graphite layer, wherein the internal graphite layer is removed to provide access to the at least one micro channel in the NiO-SDC anode substrate;
an electrolyte outer coating; and
at least one cathode ink applied to the electrolyte outer coating.

2. The fuel cell of claim 1, wherein the micro channel array is radially aligned with respect to the NiO-SDC anode substrate.

3. The fuel cell of claim 1, wherein peak power density is at least 1.5 times that of a cell with an anode substrate fabricated from a single layer extrusion method.

4. The fuel cell of claim 1, further comprising multilayered microstructures within the fuel cell.

5. The fuel cell of claim 1, wherein the micro channel array reduces a polarization resistance of the fuel cell.

6. The fuel cell of claim 1, wherein the fuel cell has an increased fuel utilization rate as compared to a conventional fuel cell.

7. The fuel cell of claim 1, wherein the fuel cell exhibits gas permeation performance approximately nine times greater than a conventional fuel cell formed from a single layer extrusion method.

8. The fuel cell of claim 1, wherein the fuel cell exhibits open circuit voltages exceeding those of a conventional fuel cell formed from a single layer extrusion method.

* * * * *